(12) United States Patent
Westfall

(10) Patent No.: US 10,931,164 B1
(45) Date of Patent: Feb. 23, 2021

(54) MECHANICAL ENERGY AND STORAGE DEVICE

(71) Applicant: Paul D. Westfall, Pearcy, AR (US)

(72) Inventor: Paul D. Westfall, Pearcy, AR (US)

( * ) Notice: Subject to any disclaimer, the term of this patent is extended or adjusted under 35 U.S.C. 154(b) by 0 days.

(21) Appl. No.: 16/724,853

(22) Filed: Dec. 23, 2019

Related U.S. Application Data

(63) Continuation of application No. 16/423,692, filed on May 28, 2019, now abandoned, which is a continuation-in-part of application No. 15/139,461, filed on Apr. 27, 2016, now abandoned, which is a continuation of application No. 14/211,983, filed on Mar. 14, 2014, now abandoned.

(60) Provisional application No. 61/783,363, filed on Mar. 14, 2013.

(51) Int. Cl.
*H02K 3/28* (2006.01)
*H02K 7/02* (2006.01)
*H02K 7/09* (2006.01)
*H02K 1/27* (2006.01)

(52) U.S. Cl.
CPC .............. *H02K 7/025* (2013.01); *H02K 1/27* (2013.01); *H02K 3/28* (2013.01); *H02K 7/09* (2013.01)

(58) Field of Classification Search
CPC ..................................................... H02K 53/00
USPC ................................. 310/216.124, 423, 431
See application file for complete search history.

(56) References Cited

U.S. PATENT DOCUMENTS

| | | |
|---|---|---|
| 4,444,444 A | 4/1984 | Benedetti et al. |
| 4,511,190 A | 4/1985 | Caye et al. |
| 4,563,046 A | 1/1986 | Shimamoto |
| 5,126,610 A | 6/1992 | Fremerey |
| 5,398,571 A | 3/1995 | Lewis |
| 5,614,777 A | 3/1997 | Bitterly et al. |
| 5,925,952 A | 7/1999 | Bichler et al. |
| 6,043,577 A | 3/2000 | Bornemann et al. |
| 6,211,589 B1 | 4/2001 | Ahlstrom et al. |
| 6,236,127 B1 | 5/2001 | Bornemann |
| 6,570,286 B1 | 5/2003 | Gabrys |
| 6,867,520 B2 | 3/2005 | Jennings |
| 6,897,587 B1 | 5/2005 | McMullen et al. |
| 6,962,223 B2 | 11/2005 | Berbari |
| 7,066,050 B1 | 6/2006 | Gabrys et al. |
| 7,180,216 B2 | 2/2007 | Hirzel et al. |

(Continued)

OTHER PUBLICATIONS

U.S. Appl. No. 14/211,983, filed Mar. 14, 2014, Westfall.

(Continued)

*Primary Examiner* — Terrance L Kenerly
(74) *Attorney, Agent, or Firm* — Fay Sharpe LLP

(57) ABSTRACT

The disclosed device is for storing energy by means of a flywheel. The device comprises a solid rotor having embedded permanent magnets along its outer surface, with flywheels attached at each end. The rotor is suspended by magnetic bearings within a housing. The housing comprises electromagnets that are sequentially charged in order to cause the rotor to spin due to the interaction of the electromagnets with the facing permanent magnets on the rotor. The spinning of the rotor causes the flywheels to spin, which results in the storage of rotational energy. The flywheels, which include magnets, turn through sets of coils on either end of the housing, thereby operating as an electrical generator to convert the flywheel rotational energy into electrical energy output from the device.

2 Claims, 30 Drawing Sheets

ASSEMBLY OF FLYWHEEL DRIVEN ELECTRIC GENERATOR AND STORAGE DEVICE

(56) References Cited

U.S. PATENT DOCUMENTS

| | | |
|---|---|---|
| 8,030,787 B2 | 10/2011 | Kalev |
| 8,120,221 B2 | 2/2012 | Novel |
| 8,269,470 B2 | 9/2012 | Hsu et al. |
| 2006/0033392 A1* | 2/2006 | Ritchey .................. H02K 7/108 310/112 |
| 2006/0131978 A1* | 6/2006 | Hirzel ...................... H02K 1/02 310/168 |
| 2007/0163828 A1 | 7/2007 | Manganaro |
| 2009/0152970 A1 | 6/2009 | Lee |
| 2010/0001697 A1* | 1/2010 | Hsu ........................ H02K 7/025 322/4 |
| 2010/0033046 A1 | 2/2010 | Chiba et al. |
| 2010/0282528 A1 | 11/2010 | Palti |
| 2011/0031827 A1 | 2/2011 | Gennesseaux |
| 2012/0176074 A1 | 7/2012 | DuBois et al. |
| 2012/0303193 A1 | 11/2012 | Gresser |
| 2013/0342033 A1 | 12/2013 | Essex |
| 2016/0272048 A1 | 9/2016 | Casasanta et al. |

OTHER PUBLICATIONS

"Breakthrough in Ricardo Kinergy 'Second Generation' High-Speed Flywheel Technology", Aug. 22, 2011, Ricardo UK, 2 pages.
Richard Post, "A New Look at an Old Idea" "The Electromechanical Battery", Science & Technology Review, Apr. 1996, pp. 12-19.
"Artemis, Bombardier and Ricardo to Collaborate on Rail Brake Energy Recovery Research", May 10, 2012, 2 pages.
www.foxnews.com/leisure/2012/04/19/ford-electric-car-battery-pack-costs-12000-15; Nov. 1, 2012, 1 page (p. 3 of 6).
http://hondaev.org/batt.html, "Honda EV+ Electric Vehicle Battery Facts", Nov. 1, 2012, p. 1 of 1.

\* cited by examiner

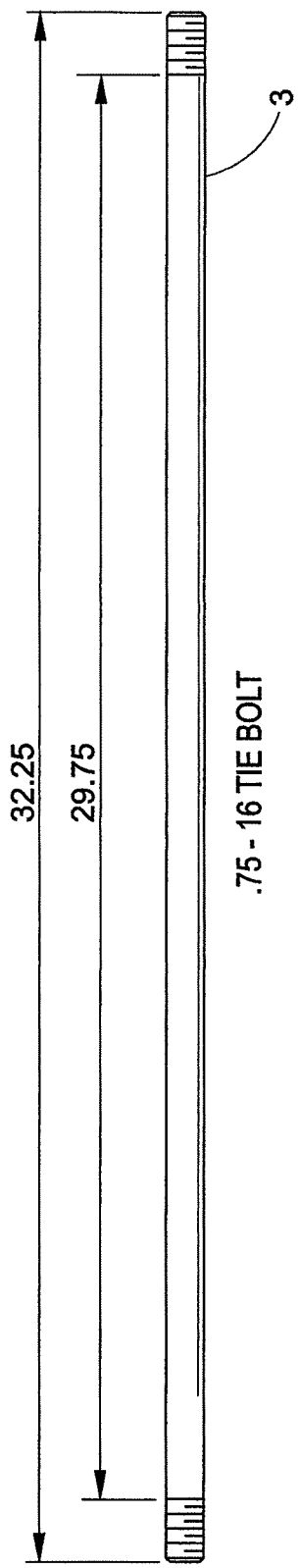
.75 - 16 TIE BOLT
FIG. 3
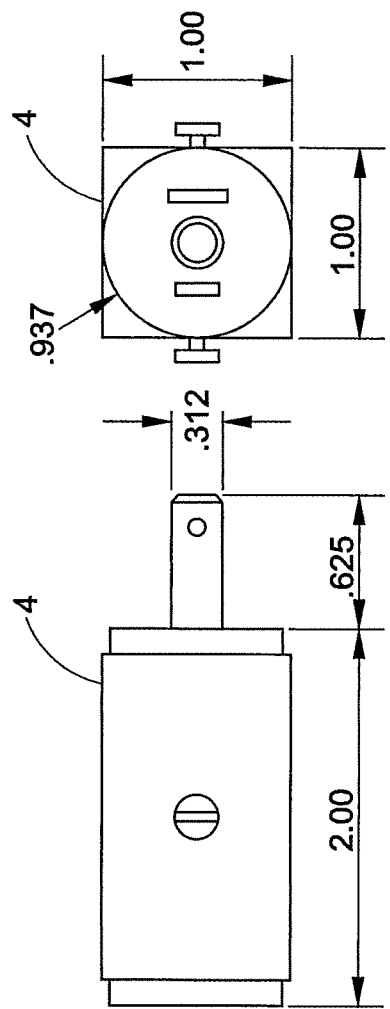
ONE INCH ELECTRO-MAGNET
PLATES ELECTRICAL CONNECTOR
FIG. 4
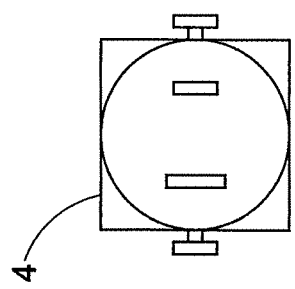

BUS BAR FOR PICK-UP COILS

DUAL SHRADER VALVE WITH CUT-OFF

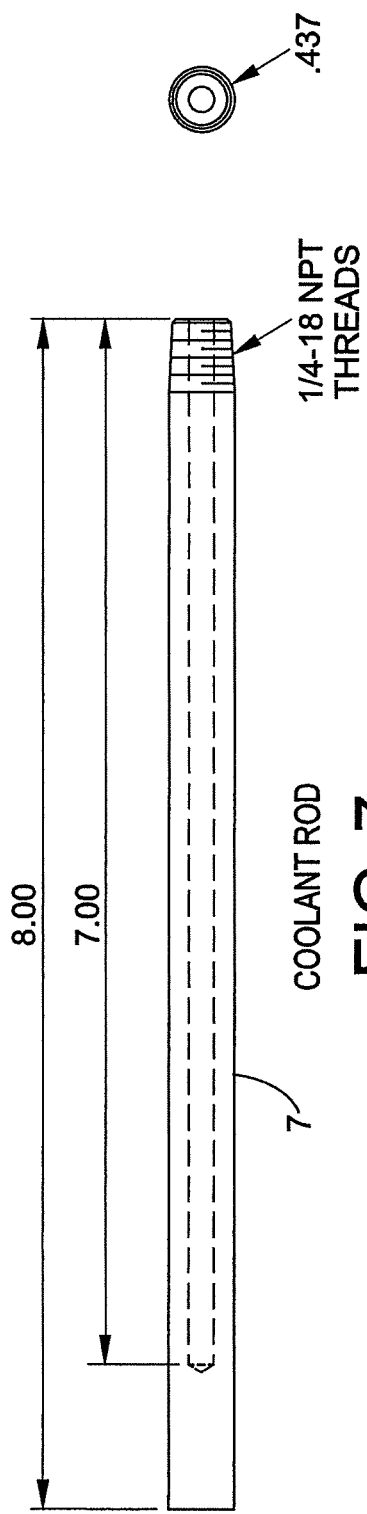
FIG. 7 COOLANT ROD
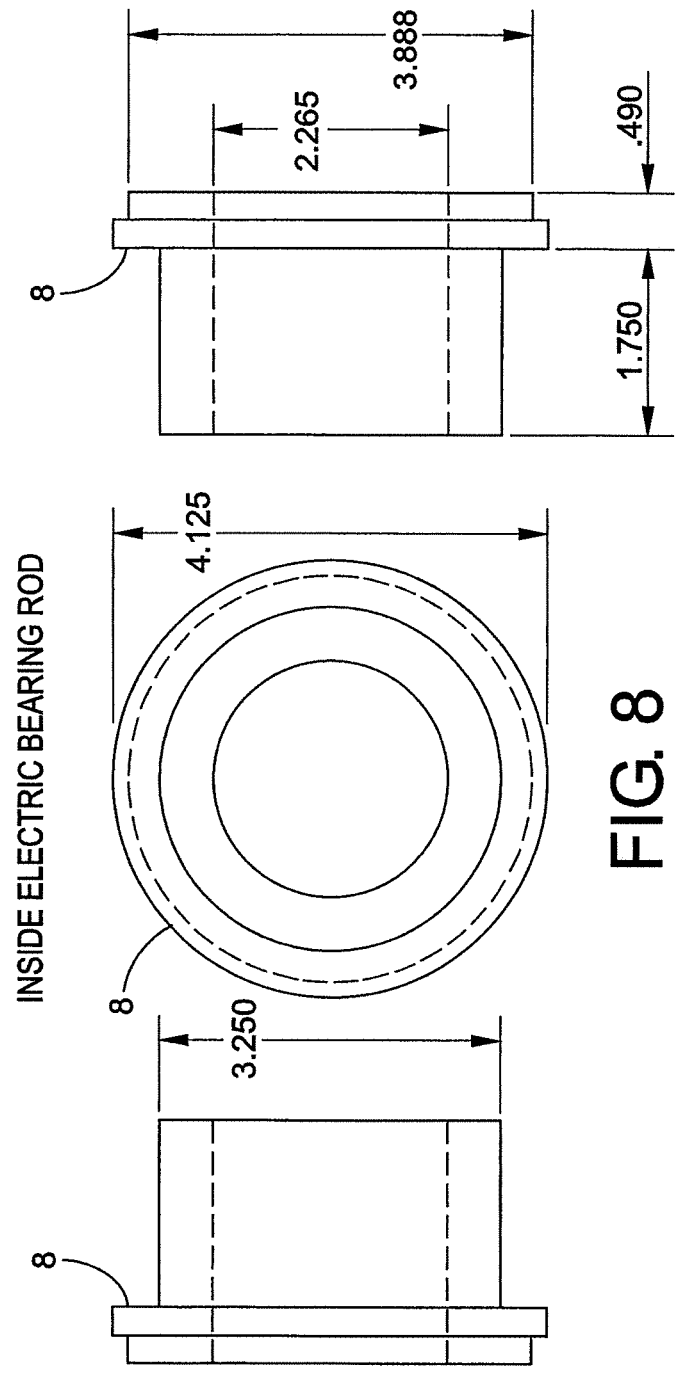
FIG. 8 INSIDE ELECTRIC BEARING ROD

FIG. 12  INSIDE BEARING SUPPORT PLATE AND COOLANT RESERVOIR

PICK-UP AND COIL MOUNTING BOLT

PICK-UP 60 AMP COIL

OUTER BEARING INSULATOR

OUTER ELECTRIC BEARING ROD

PICK-UP COIL BOX SPACER

FIG. 23   11 IN. x 1 IN. FLYWHEEL

MAIN SHAFT

PERMANENT MAGNETS FOR INSIDE ELECTRIC BEARING

OUTER PERM MAGNETS FOR OUTSIDE ELECTRIC BEARING

ONE INCH BAR FOR ELECTRO-MAGNET

ONE INCH ELECTRO-MAGNET COIL 3W 1-AMP

ONE INCH ELECTRO-MAGNET INSULATOR COIL ENDS

FIG. 38    LID FOR ONE INCH ELECTRO-MAGNET SUPPORT PLATE

ONE INCH ELECTRO-MAGNET SUPPORT PLATE

ONE INCH ELECTRO-MAGNET SUPPORT PLATE

FIG. 41  LID FOR ONE INCH ELECTRO-MAGNET SUPPORT PLATE

MECHANICAL ENERGY AND STORAGE DEVICE

The present invention is a continuation of U.S. patent application Ser. No. 16/423,692, filed May 28, 2019, which is a continuation-in-part of U.S. patent application Ser. No. 15/139,461, filed Apr. 27, 2016, which is a continuation of U.S patent application Ser. No. 14/211,983, filed Mar. 14, 2014, which in turn claims benefit of U.S Provisional patent application Ser. No. 61/783,363, filed Mar. 14, 2013 which are incorporated herein by reference in their entirety.

INCORPORATION BY REFERENCE

U.S. patent application Ser. No. 14/211,983, by Westfall, filed Mar. 14, 2014 and entitled "Mechanical Energy and Storage Device";

U.S. Pat. No. 6,236,127, by Bornemann, issued May 22, 2001 and entitled "Flywheel Energy Accumulator";

U.S. Pat. No. 6,043,577, by Bornemann et al., issued Mar. 28, 2000 and entitled "Flywheel Energy Accumulator";

U.S. Pat. No. 8,030,787, by Kalev, issued Oct. 4, 2011 and entitled "Mbackup Fly Wheel Power Supply";

U.S. Pat. No. 6,867,520, by Jennings, issued Mar. 15, 2005 and entitled "Electro-Mechanical Battery";

U.S. Patent Application Publication No. 2012/0176074, by Dubois et al., published Jul. 12, 2012 and entitled "System for Decoupling a Rotor from a Stator of a Permanent Magnet Motor and Flywheel Storage System Using the Same";

U.S. Pat. No. 4,444,444, by Benedetti et al., issued Apr. 24, 1987 and entitled "Equipment for Storage of Energy Under Kinetic Form and Recovery Thereof in Electric Form";

U.S. Pat. No. 4,563,046, by Shimamoto, issued Jan. 7, 1986 and entitled "Flywheel Apparatus";

U.S. Pat. No. 5,398,571, by Lewis, issued Mar. 21, 1995 and entitled "Flywheel Storage System with Improved Magnetic Bearings";

U.S. Pat. No. 5,614,777, by Bittterly et al., issued Mar. 25, 1997 and entitled "Flywheel Based Energy Storage System";

U.S. Pat. No. 5,925,952, by Bichler et al., issued Jul. 20, 1999 and entitled "Magnetically Mounted, Position-Stabilized Flywheel";

U.S. Pat. No. 6,211,589, by Ahlstrom et al., issued Apr. 3, 2001 and entitled "Magnetic Systems for Energy Storage Flywheels";

U.S. Pat. No. 6,962,223, by Berbari, issued Nov. 8, 2005 and entitled "Flywheel-Driven Vehicle";

U.S. Pat. No. 6,897,587, by McMullen et al., issued May 24, 2005 and entitled "Energy Storage Flywheel with Minimum Power Magnetic Bearings and Motor/Generator";

U.S. Pat. No. 6,570,286, by Gabrys, issued May 27, 2003 and entitled "Full Magnetic Bearings with Increased Load Capacity";

U.S. Pat. No. 5,126,610, by Fremerey, issued Jun. 30, 1992 and entitled "Axially Stabilized Magnetic Bearing Having a Permanently Magnetized Radial Bearing";

U.S. Pat. No. 4,511,190, by Caye et al., issued Apr. 16, 1985 and entitled "Kinetic Wheel Arrangement Incorporating Magnetic Bearings, Particularly for Storing Energy";

U.S. Patent Application Publication No. 2007/0163828, by Manganaro, published Jul. 19, 2007 and entitled "Flywheel Drive System for a Motor Vehicle and Method Therefor";

U.S. Patent Application Publication No. 2012/0303193, by Gresser, published Nov. 29, 2012 and entitled "Electricity Generating Suspension System for Hybrid and Electric Automobiles";

U.S. Patent Application Publication No. 2010/0033046, by Chiba et al., published Feb. 11, 2010 and entitled "Rotating Electric Machine";

"Breakthrough in Ricardo Kinergy 'Second Generation' High-Speed Flywheel Technology", Aug. 22, 2011, Ricardo UK, 2 pages;

U.S. Patent Application Publication No. 2011/0031827, by Gennesseaux, published Feb. 10, 2011 and entitled "Energy Storage Device Comprising A Flywheel";

Richard Post, "A New Look at An Old Idea The Electromechanical Battery", Science & Technology Review, April 1996, pages 12-19;

"Artemis, Bombardier and Ricardo to Collaborate on Rail Brake Energy Recovery Research", May 10, 2012, 2 pages; www.foxnews.com/leisure/2012/04/19/ford-electric-car-battery-pack-costs-12000-15; Nov. 1, 2012, 1 page (page 3 of 6); and, http://hondaev.org/batt.html, "Honda EV+ Electric Vehicle Battery Facts", Nov. 1, 2012, page 1 of 1, are incorporated herein by reference in their entirety.

BRIEF DESCRIPTION

One embodiment of the present invention includes an electromechanical energy storage device comprising a rotating member including a plurality of permanent magnets, a stationary member including a plurality of electromagnets spaced at 45 degree intervals, a magnetic bearing system for supporting said rotating member with respect to said stationary member, one or more fly wheel hub assemblies forming an energy storage portion of said system, and a permanent magnet generator with a plurality of permanent magnets integral with said fly wheel hub.

Another embodiment of the present invention includes an electromechanical energy storage system comprising a rotating member including a plurality of permanent magnets, a stationary member including a plurality of electromagnets spaced at 45 degree intervals, a magnetic bearing system for supporting said rotating member with respect to said stationary member, one or more fly wheel hub assemblies forming an energy storage portion of said system, and a permanent magnet generator with a plurality of permanent magnets integral with said fly wheel hub.

Another embodiment of the present invention includes an electromechanical device comprising:

a stationary housing member including a longitudinally extended rotor cavity and a plurality of longitudinally adjacent rows of equally spaced electromagnets which are offset 45 degrees and directed towards the rotor cavity, each row of electromagnets arranged in an octagonal shape and each row of electromagnets rotationally offset 22.5 degrees from each longitudinally adjacent row of electromagnets, and each electromagnet configured to simultaneously generate equivalent magnetic fields of equivalent polarities;

a rotating member longitudinally extended within the rotor cavity of the stationary housing member, the rotating member including a plurality of longitudinally adjacent rows of permanent magnets equally spaced and arranged along an outside surface of the rotary member, each row of permanent magnets arranged in a circular shape and rotationally offset 15 degrees from each longitudinally adjacent row of permanent magnets and each permanent magnet configured to simultaneously generate equivalent magnetic fields of equivalent polarities which are repellant to the electromagnet generated equivalent magnetic fields of equivalent polarities, and each permanent magnet set on an incline of 1.5 degrees relative to the outside surface of the rotating member to provide a rotational movement of the rotating member with the stationary housing member plurality of longitudinally adjacent rows of electromagnets energized;

a magnetic bearing system for supporting the rotating member with respect to the stationary housing member; and one or more fly wheel hub assemblies operatively coupled to the rotating member, the one or more fly wheel hub assemblies including a permanent magnet electrical generator integral with the one or more fly wheel hub assemblies, the permanent magnetic electrical generator configured to generate electrical power as the rotating member rotates within the stationary housing member rotor cavity.

Another embodiment of the present invention includes an electromechanical device comprising:

a stationary housing member including a longitudinally extended rotor cavity and a plurality of longitudinally adjacent rows of equally spaced electromagnets which are offset 45 degrees and directed towards the rotor cavity, each row of electromagnets mounted to an independent section of the stationary housing member and each row of electromagnets arranged in an octagonal shape and each row of electromagnets rotationally offset 22.5 degrees from each longitudinally adjacent row of electromagnets, and each electromagnet configured to simultaneously generate equivalent magnetic fields of equivalent polarities;

a rotating member longitudinally extended within the rotor cavity of the stationary housing member, the rotating member including a plurality of longitudinally adjacent rows of permanent magnets equally spaced and arranged along an outside surface of the rotary member, each row of permanent magnets arranged in a circular shape and rotationally offset 15 degrees from each longitudinally adjacent row of permanent magnets and each permanent magnet configured to simultaneously generate equivalent magnetic fields of equivalent polarities which are repellant to the electromagnet generated equivalent magnetic fields of equivalent polarities, and each permanent magnet set on an incline of 1.5 degrees relative to the outside surface of the rotating member to provide a rotational movement of the rotating member with the stationary housing member plurality of longitudinally adjacent rows of electromagnets energized; and one or more fly wheel hub assemblies operatively coupled to the rotating member, the one or more fly wheel hub assemblies including a permanent magnet electrical generator integral with the one or more fly wheel hub assemblies, the permanent magnetic electrical generator configured to generate electrical power as the rotating member rotates within the stationary housing member rotor cavity.

BRIEF DESCRIPTION OF THE DRAWINGS

FIG. 3 is a 0.750 tie bolt.
FIG. 4 is a one inch electromagnet plate electrical connector.
FIG. 7 is a coolant rod.
FIG. 8 is an inside electric bearing rod.

DETAILED DESCRIPTION

Figure 1:
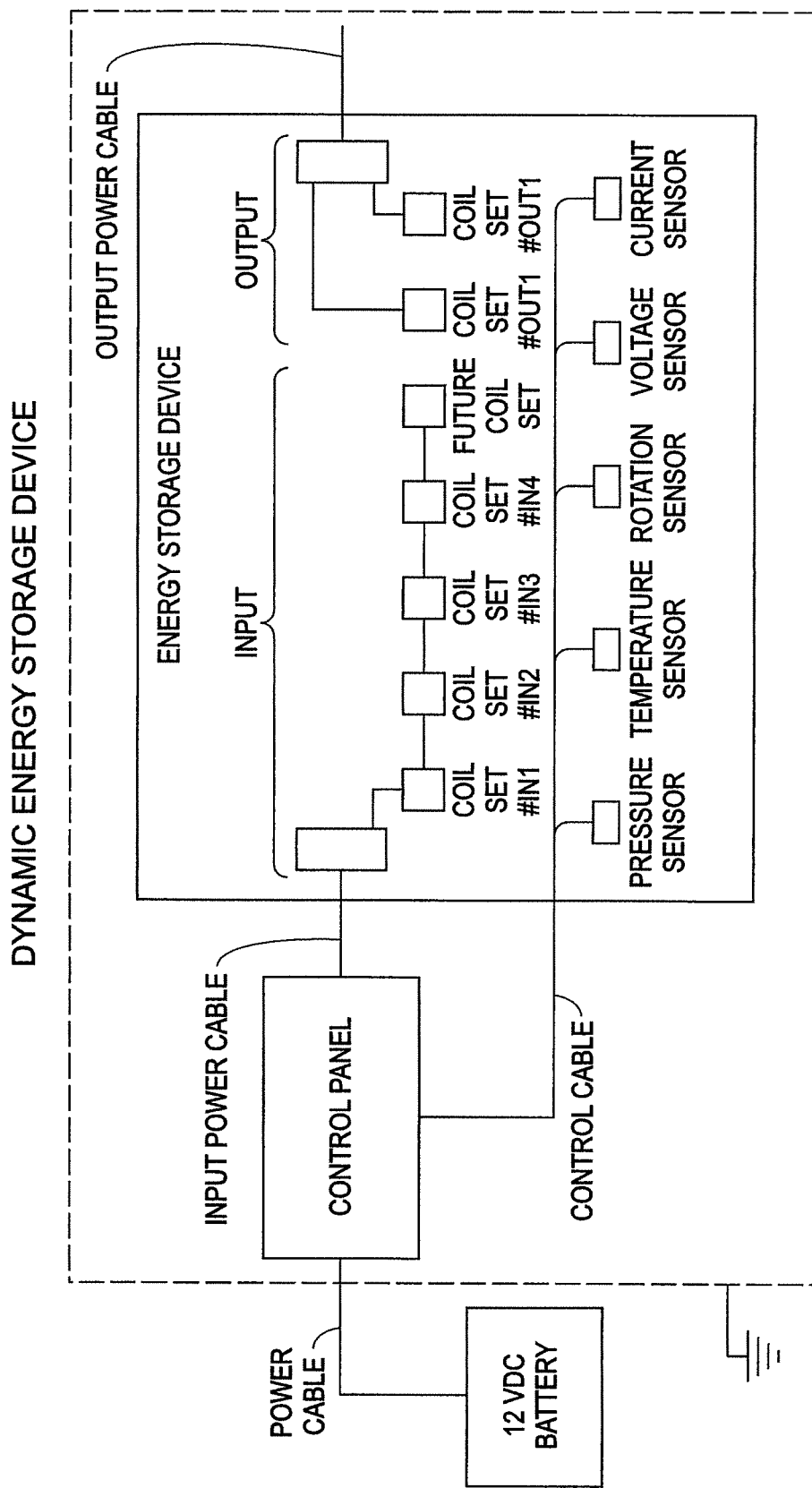
FIG. 1 is a dynamic block wiring diagram.
Figure 2:
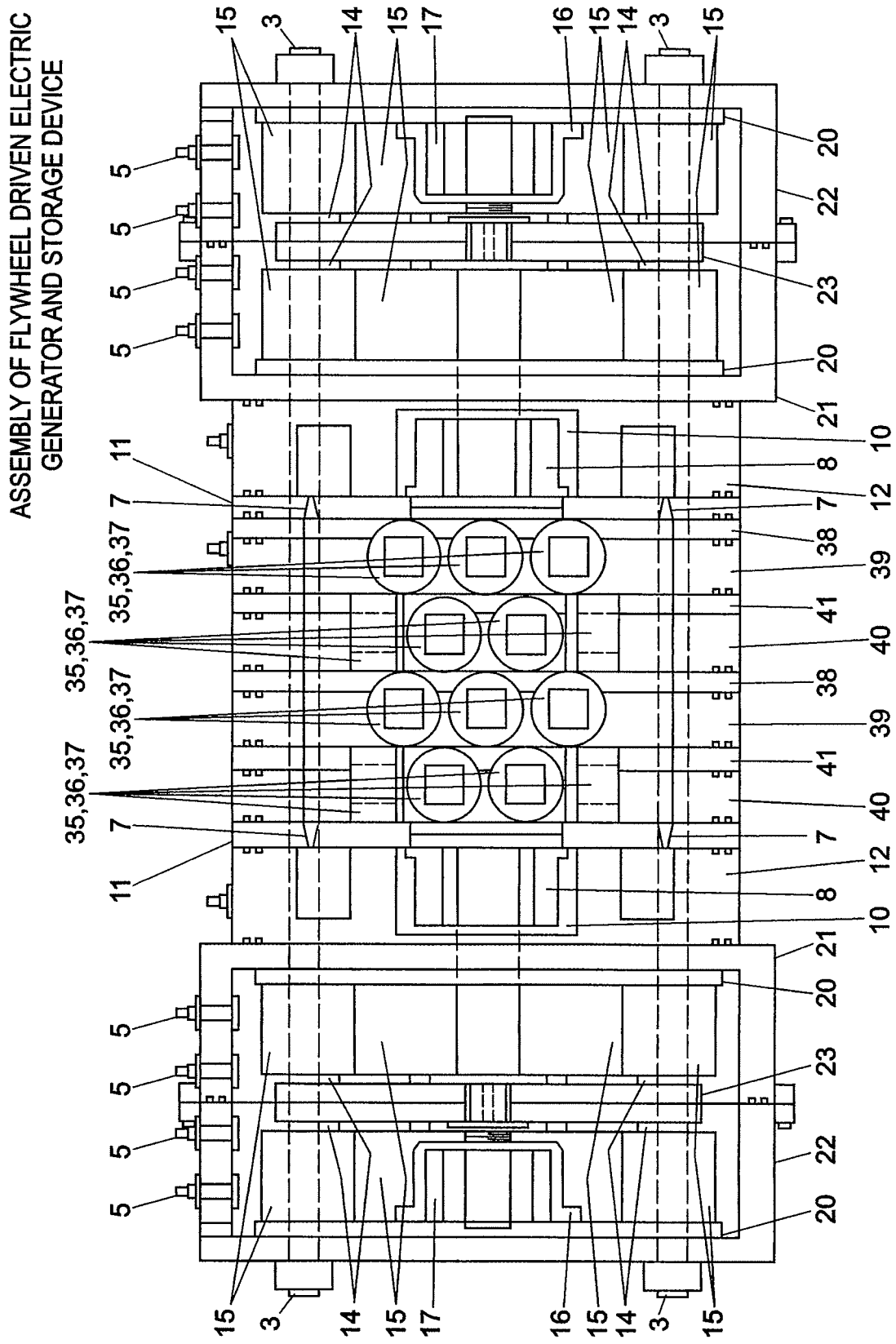
FIG. 2 is an assembly view of a flywheel driven electric generator and storage device known as a "Jim".
Figure 5:
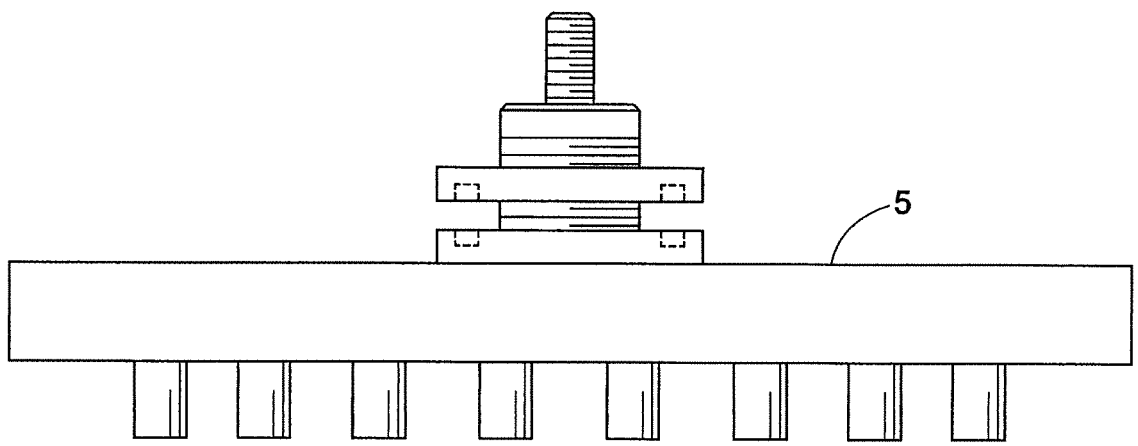
FIG. 5 is a bus bar for pick-up coils.
Figure 6:
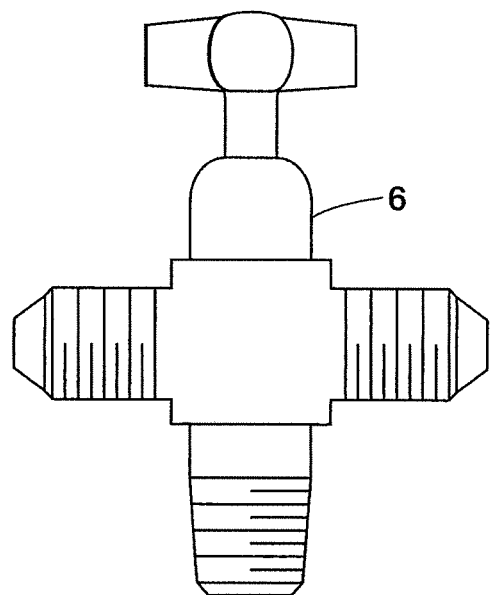
FIG. 6 is a dual shrader valve with cut-off.
Figure 9:
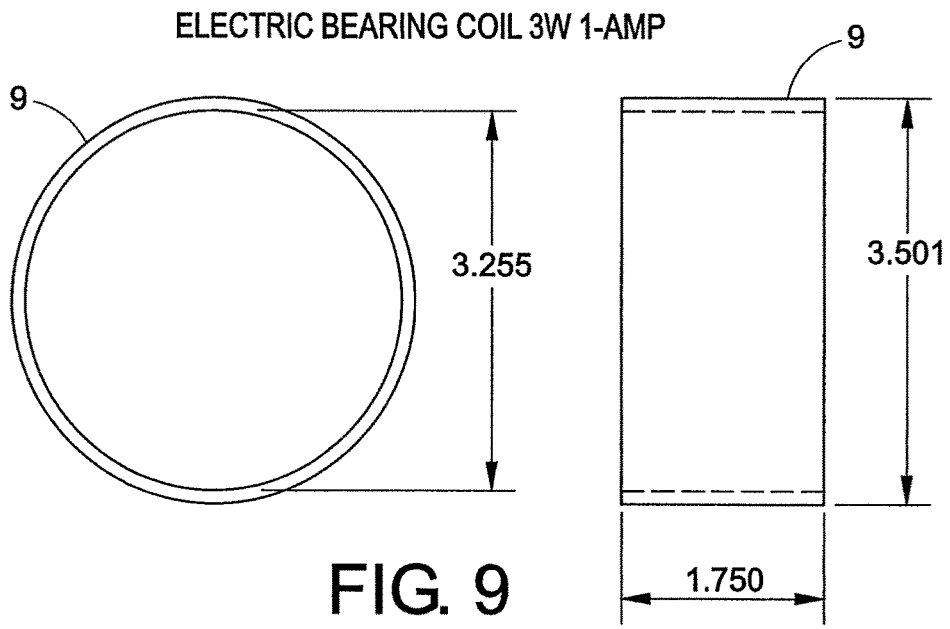
FIG. 9 is an electric bearing coil.
Figure 10:
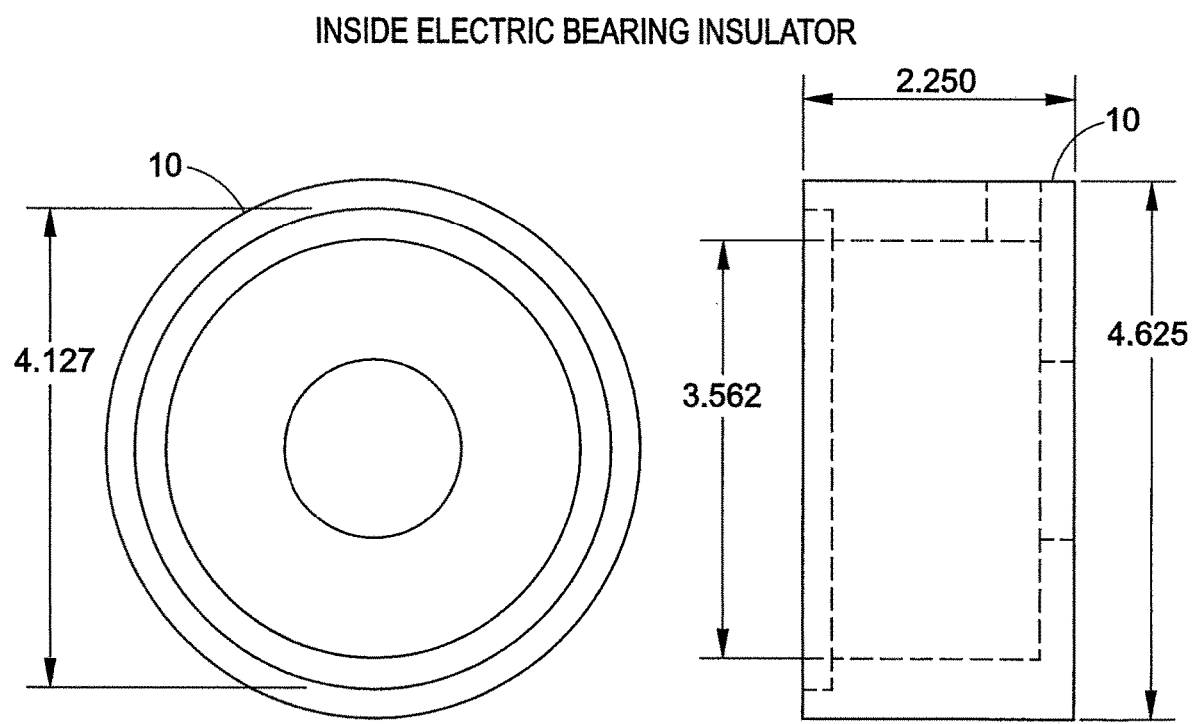
FIG. 10 is an inside electric bearing insulator.
Figure 11:
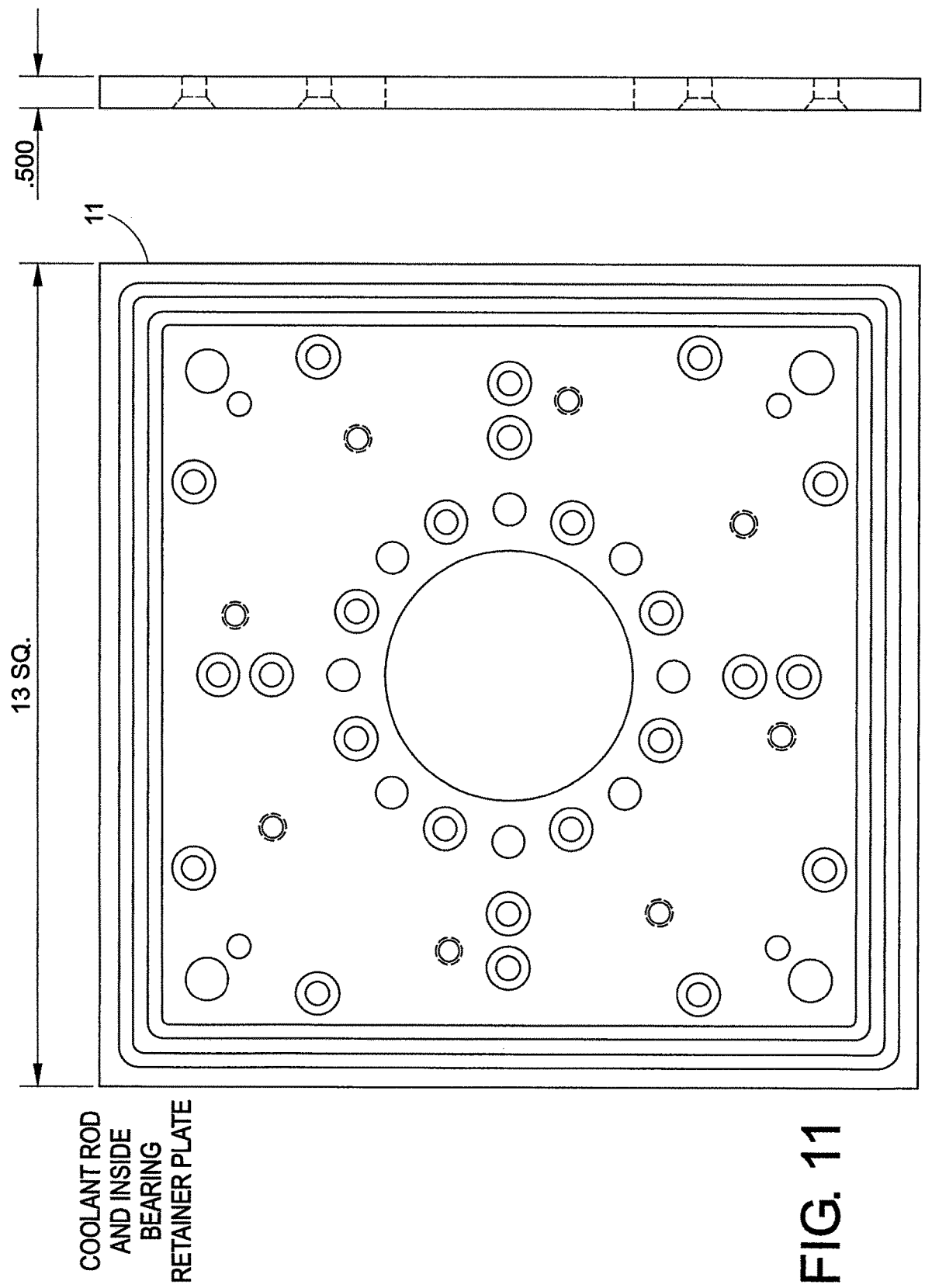
FIG. 11 is a coolant rod and inside bearing retainer plate.
Figure 12:
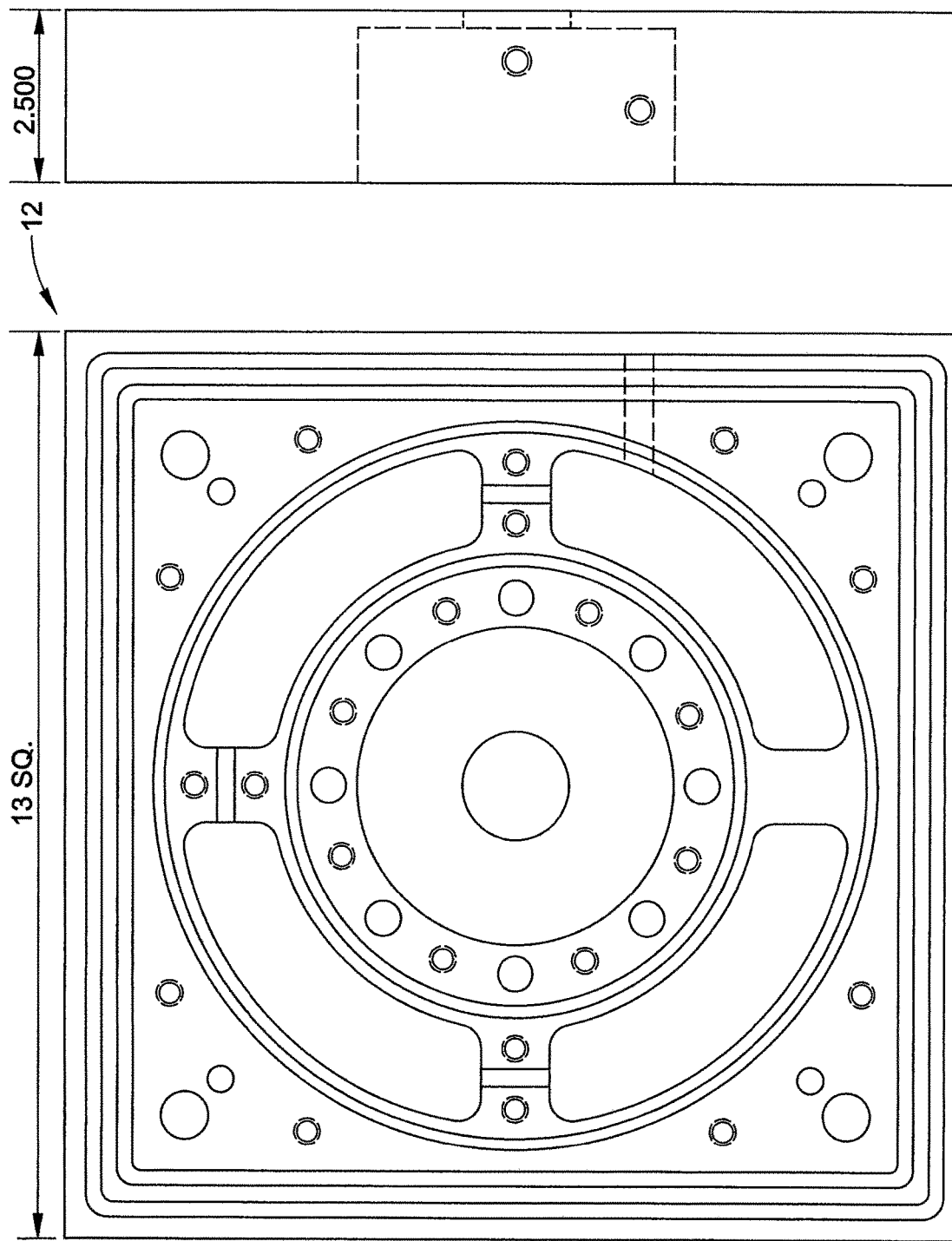
FIG. 12 is an inside bearing support plate and coolant reservoir.
Figure 13:
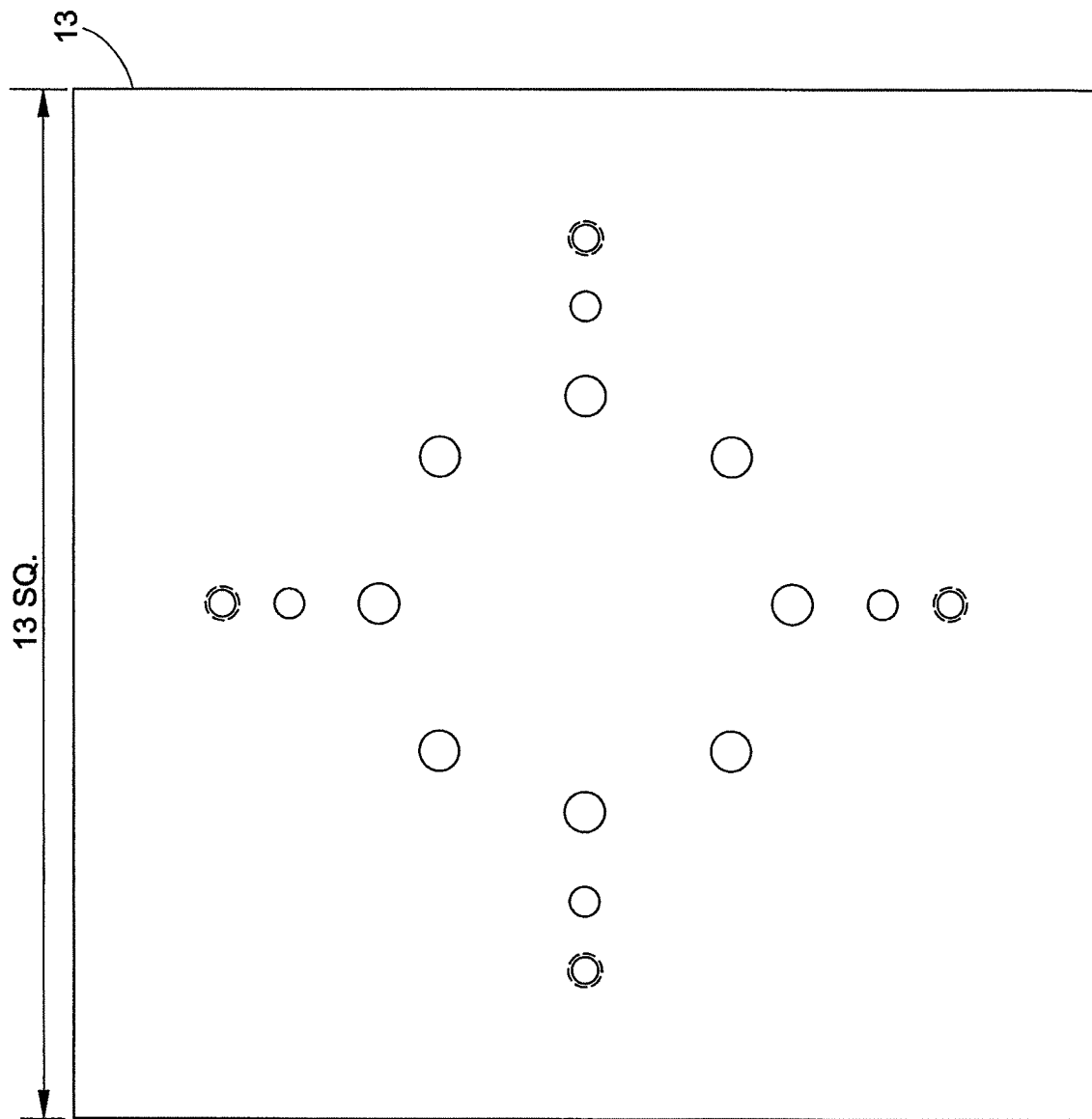
FIG. 13 is a backside of the inside bearing support and coolant reservoir plate.
Figure 14:
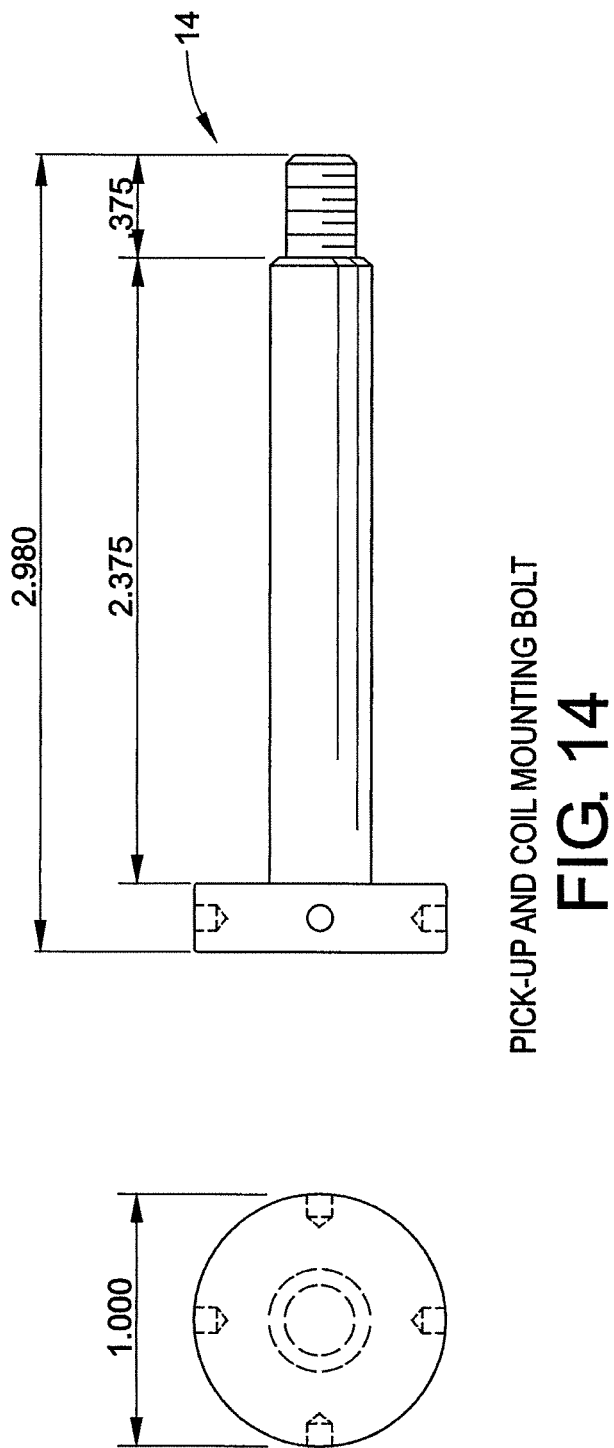
FIG. 14 is a pick-up and coil mounting bolt.
Figure 15:
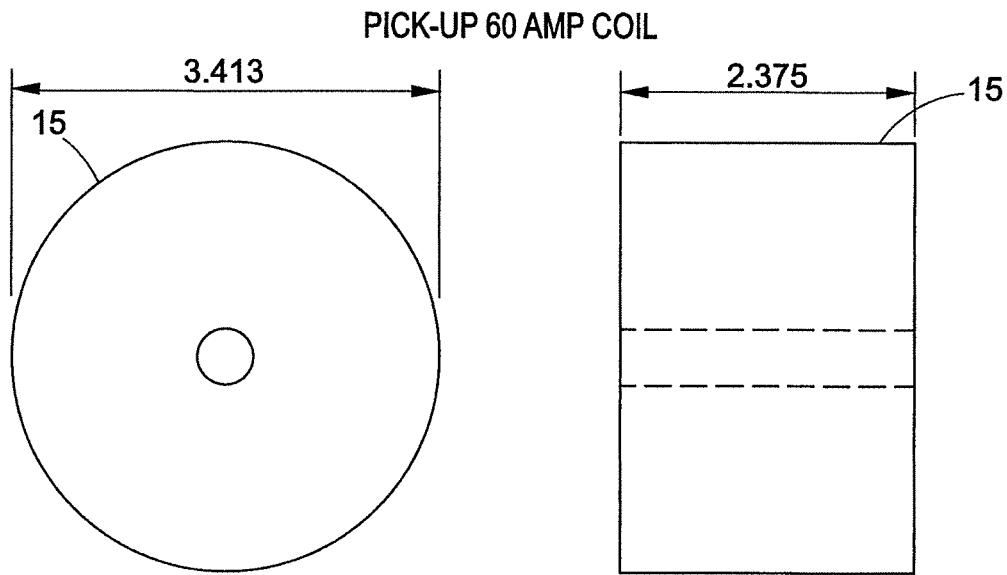
FIG. 15 is a pick-up 60 amp coil.
Figure 16:
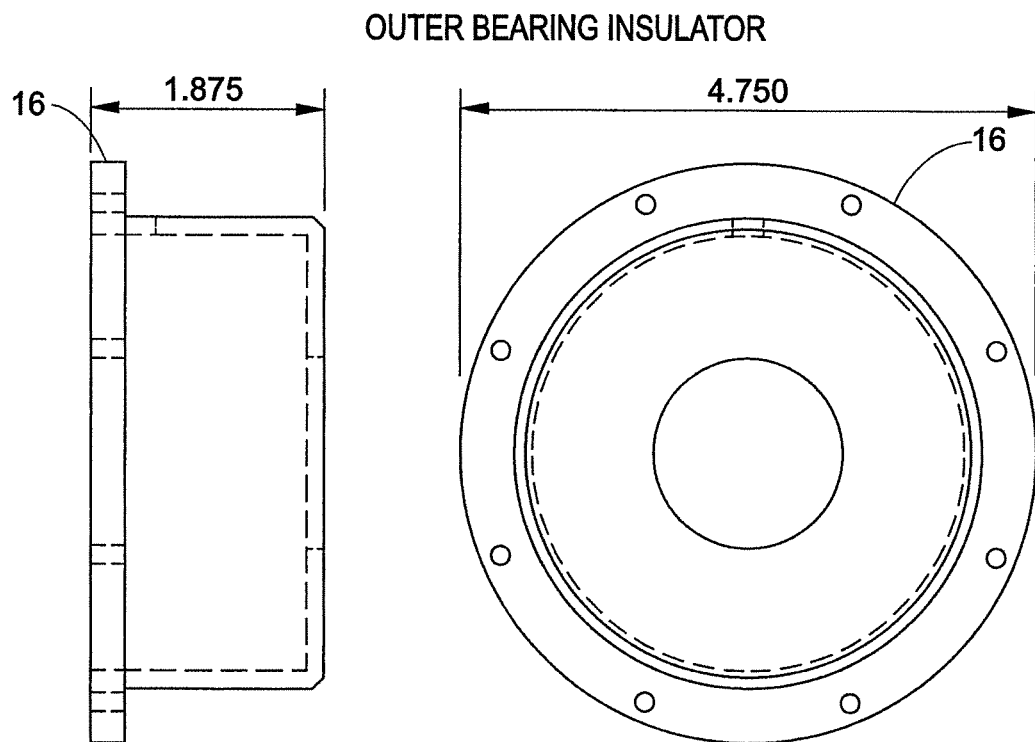
FIG. 16 is an outer bearing insulator.
Figure 17:
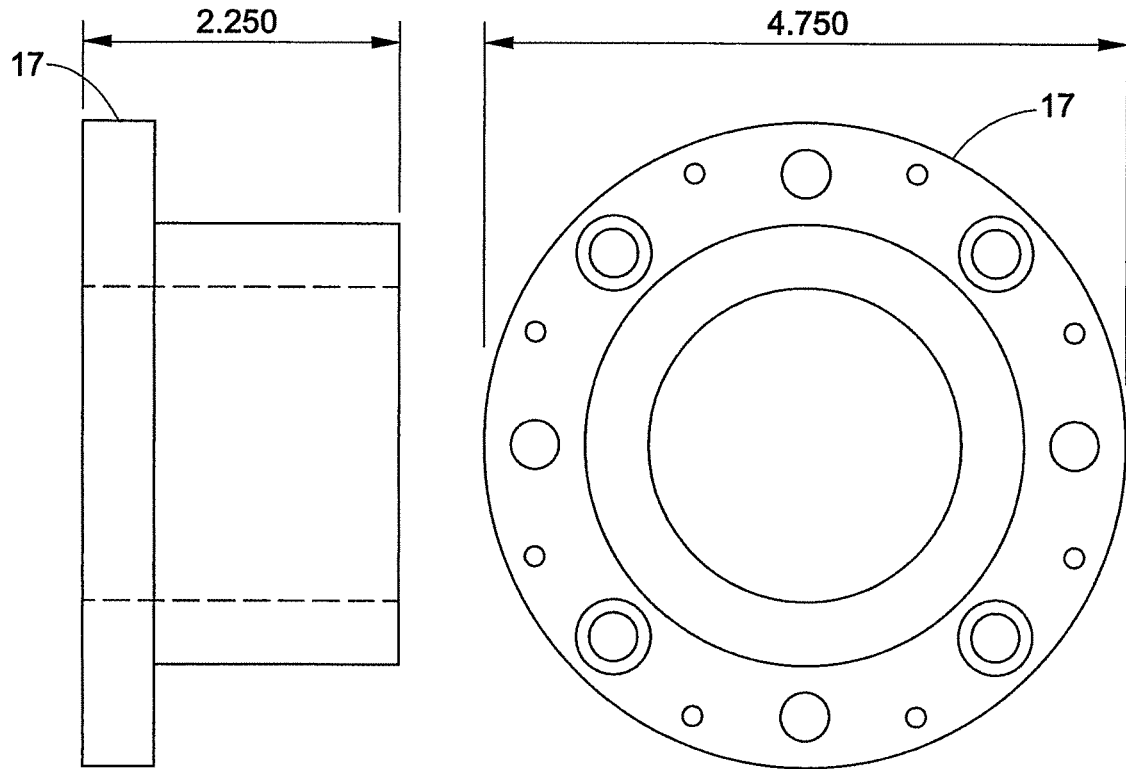
FIG. 17 is an outer electric bearing rod.
Figure 18:
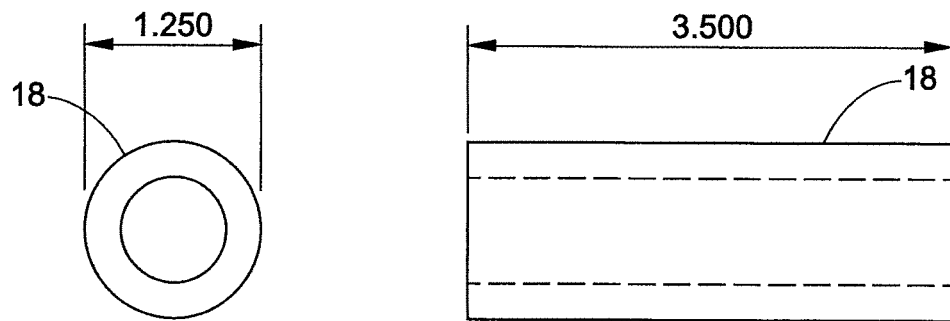
FIG. 18 is a pick-up coil box spacer.
Figure 19:
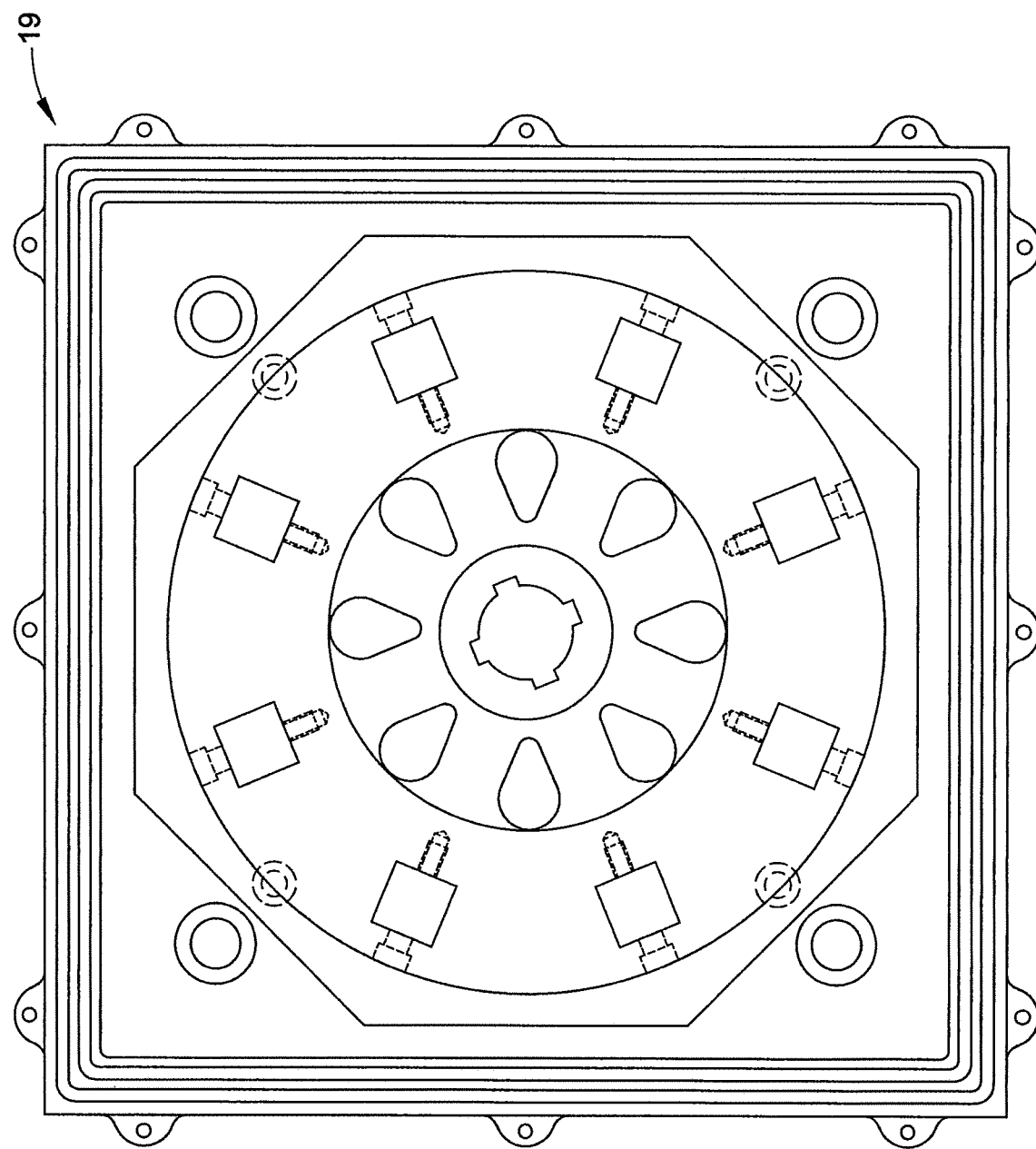
FIG. 19 is an assembly view of a flywheel and pick-up coil.
Figure 20:
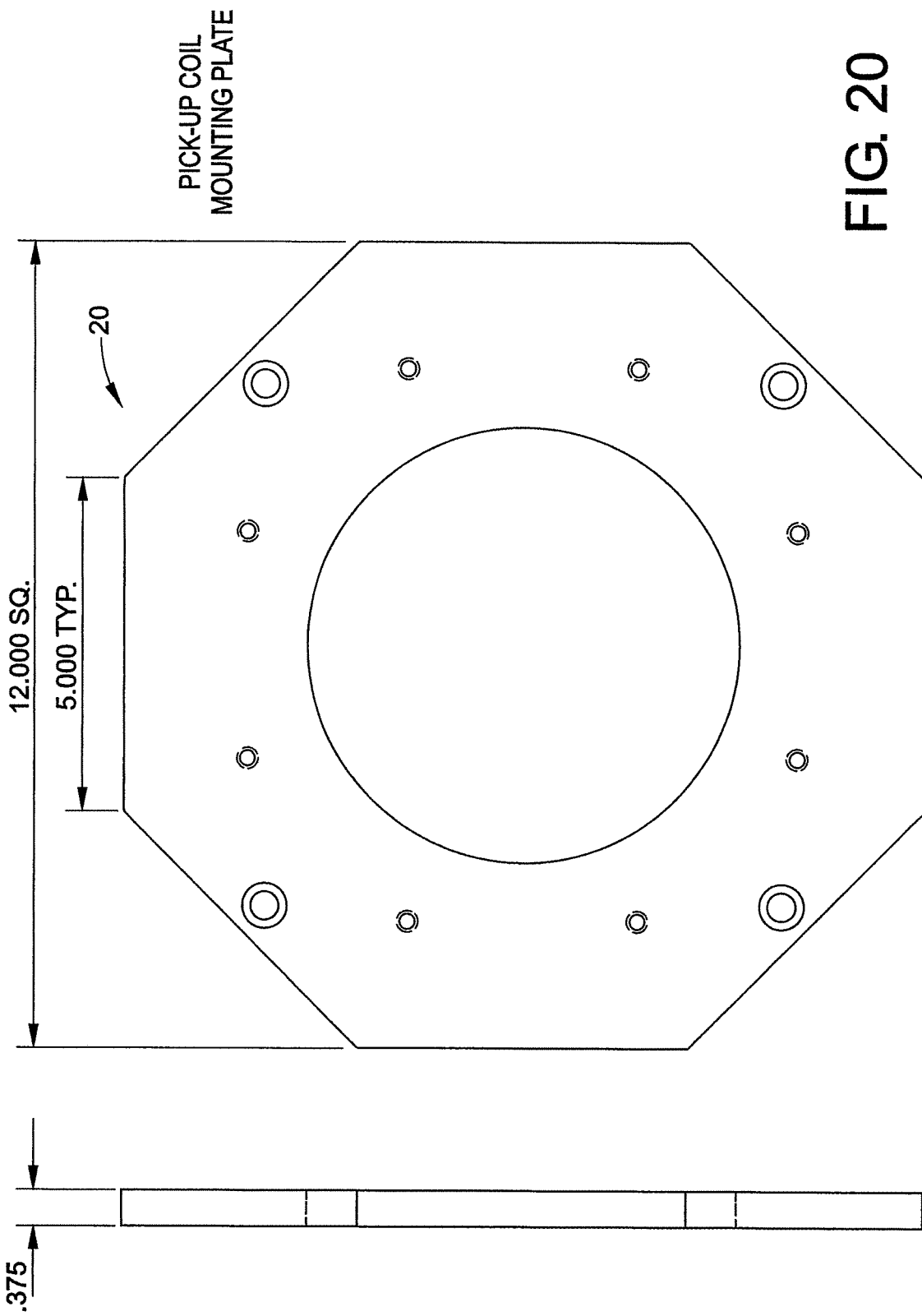
FIG. 20 is a pick-up coil mounting plate.
Figure 21:
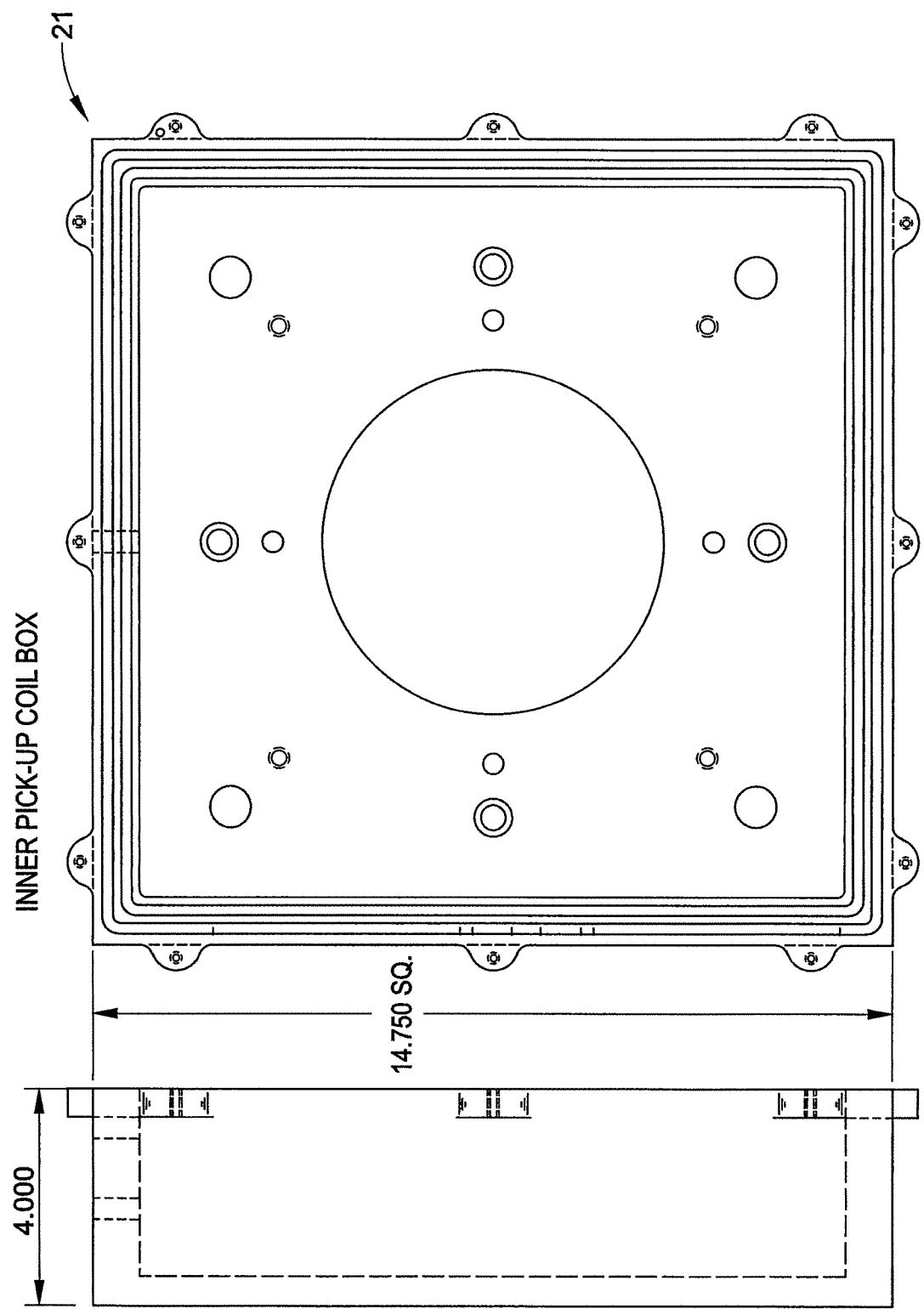
FIG. 21 is an inner pick-up coil box, inner pick-up box.
Figure 22:
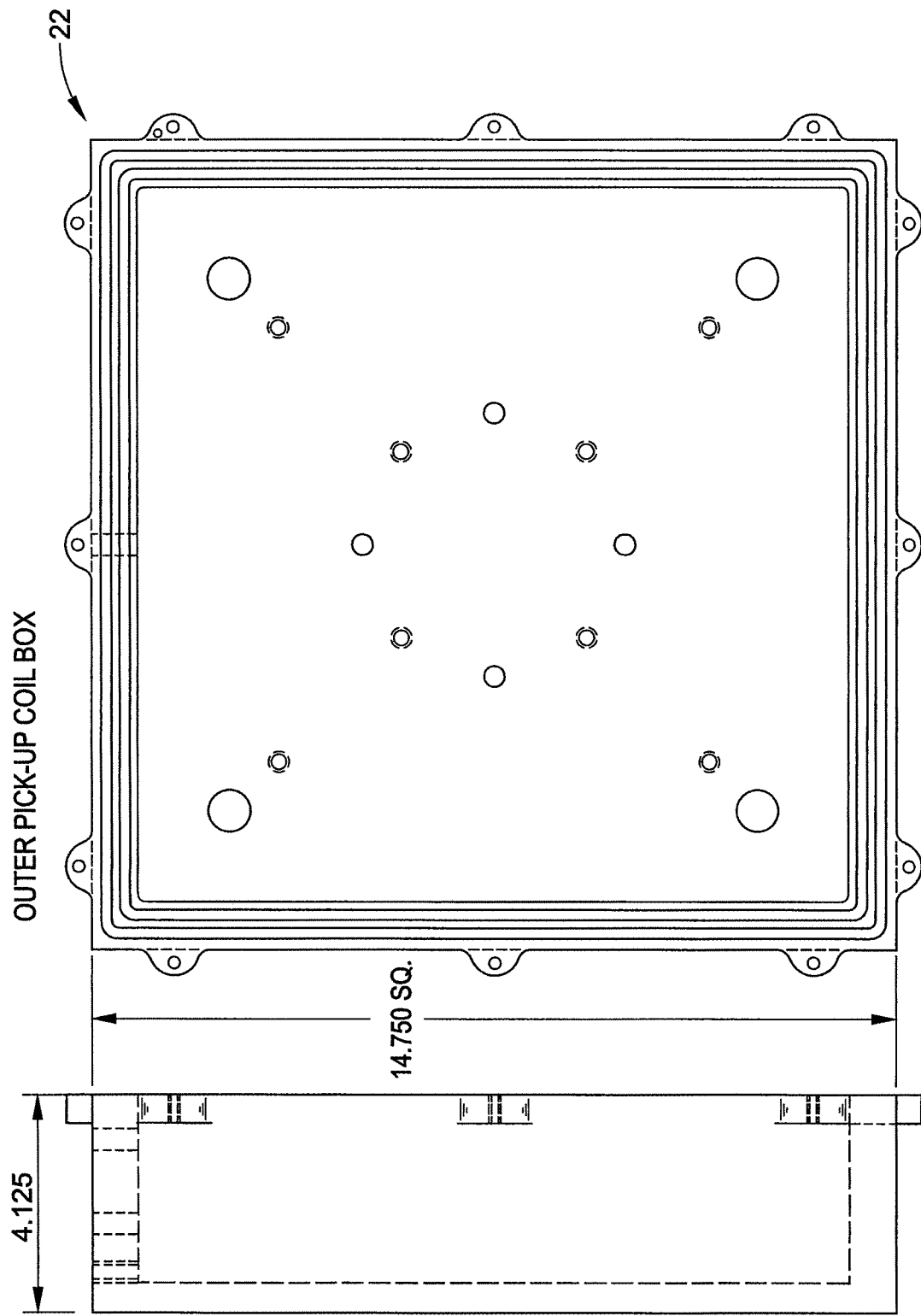
FIG. 22 is an outer pick-up coil box.
Figure 23:
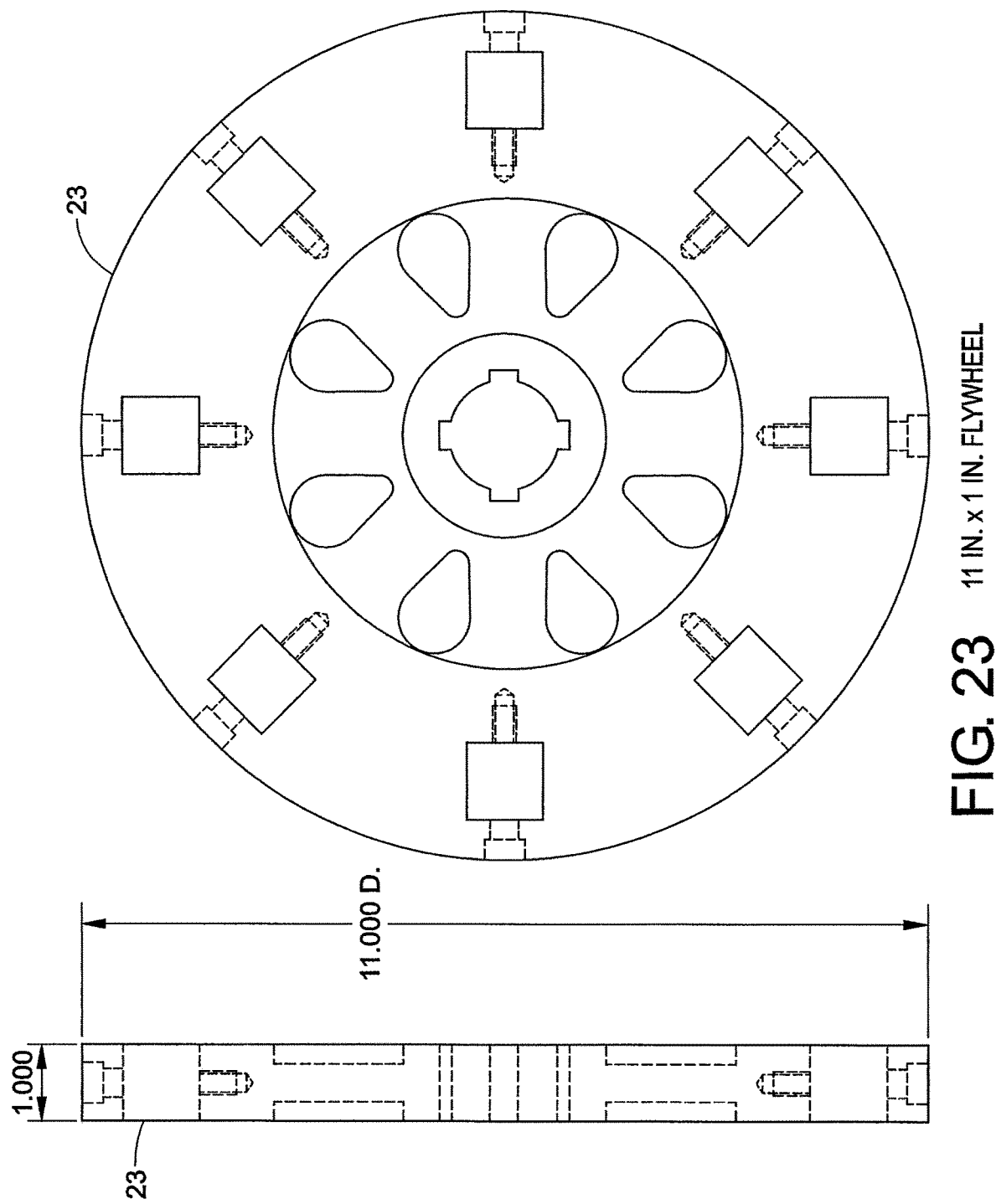
FIG. 23 is an 11 inch x 1 inch flywheel.
Figure 24:
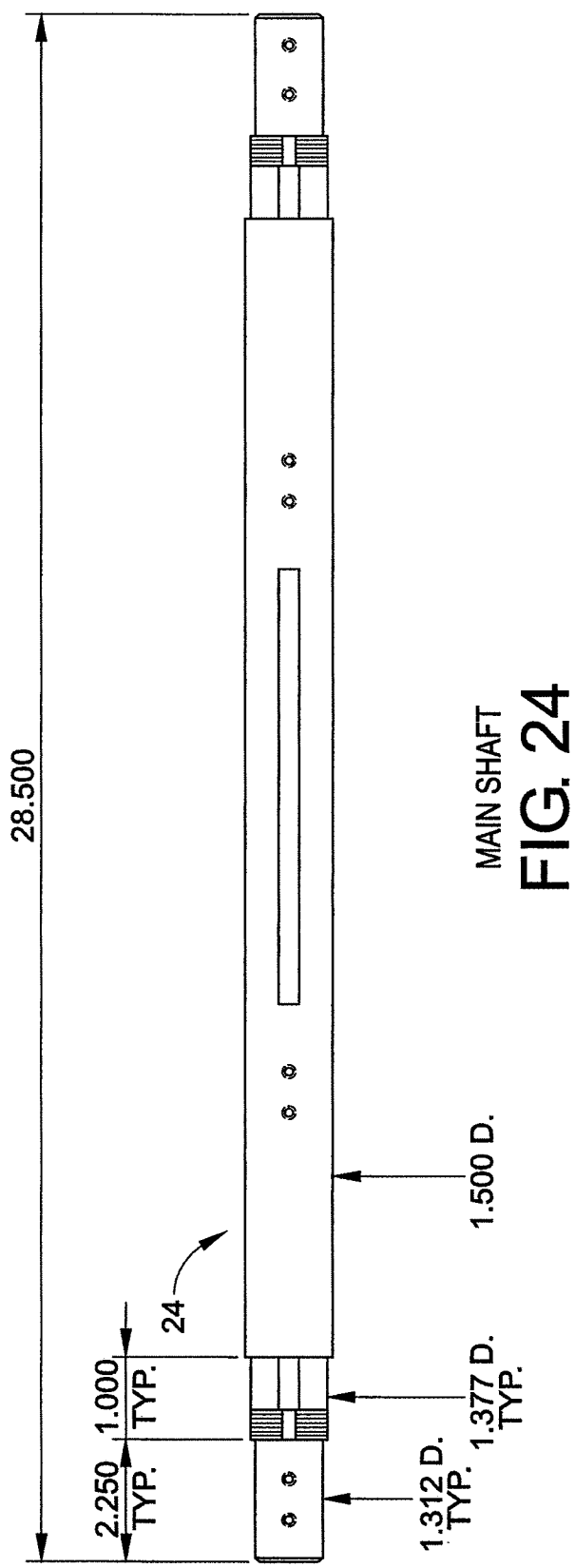
FIG. 24 is a main shaft.
Figure 25:
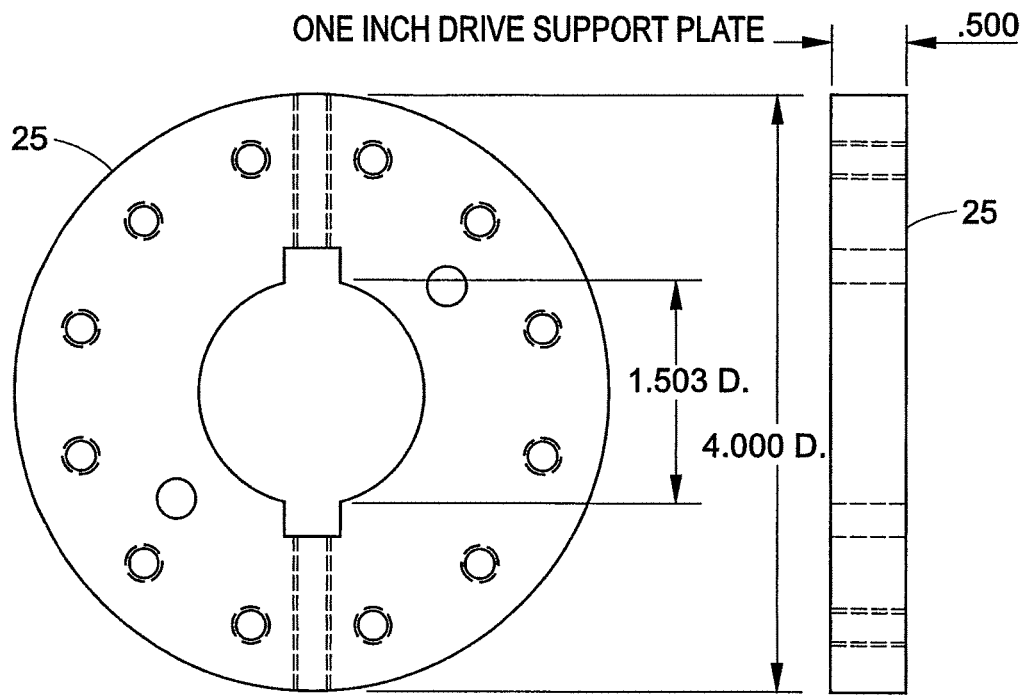
FIG. 25 is a one inch drive support plate.

The Flywheel Drive Electric Generator disclosed by Free Earth Resources LLC is an oil and gas alternative energy producing device. This green energy can potentially eliminate and/or augment the need for solar, nuclear, fossil fuels, hydropower and wind powered turbines. The disclosed power plant is silent running and lightweight compared to traditional generators and motors. Moreover, unscheduled maintenance issues are minimized. The power plant is started by batteries but, once running, will generate enough energy to power cars, etc. and accomplish work. Automotive industries, electric utilities and the military will benefit from the flywheel drive electric generator.

With the use of flywheels energy is stored. Electric car battery packs store around 25 kW of energy and weigh around 825 lb. each, not to mention the substantial cost. The flywheel drive electric generator from Free Earth Resources, LLC disclosed herein can store at least the same energy and weighs much less. It weighs a third to a fourth as much and can store the same energy as electric car batteries. According to an exemplary embodiment, the two flywheels are ten inch diameter like ring type with maraging steel or other density material used allowing it to produce more than 25 kW of power. Battery energizes the electro bearings then electromagnets pushing against permanent magnets rotating the shaft with flywheel at each end and generating power and storing energy in flywheels making it flywheel electro mechanical battery power source.

The disclosed device is for storing energy by means of a flywheel. The device comprises a solid rotor having embedded permanent magnets along its outer surface, with flywheels attached at each end. The rotor is suspended by magnetic bearings within a housing. The housing comprises electromagnets that are simultaneously charged in order to cause the rotor to spin due to the interaction of the electromagnets with the facing permanent magnets on the rotor. The spinning of the rotor causes the flywheels to spin, which results in the storage of rotational energy. The flywheels, which include magnets, turn through sets of coils on either end of the housing, thereby operating as an electrical generator to convert the flywheel rotational energy into electrical energy output from the device.

Traditional Fly Wheel Drive Electric Generators known in the art work off of electromagnets and permanent magnets also known as rare earth magnets. Rather than standard magnetism which involves attraction of positive and negative north and south poles, the flywheel drive electric generator works opposite as they repel magnetic poles. The design disclosed herein utilizes thirty- two electromagnets that are one inch in diameter, eight in each row set up in octagonal shaped pointing inwards in the center of the housing. The magnets are equally spaced 45 degrees apart. Furthermore, a second section is fastened to the flat side of the housing with electromagnets rotated 22.5 degrees.

A third section is positioned in the same location as the first section. Moreover, a fourth section of magnets are placed like the second row fastened to the third row. There is an end plate on each end with a bore and electromagnetic bearings within it on center line with the center of the electromagnets. A shaft runs through bearings with forty-eight one inch wide and one inch long permanent magnets fastened to it. Twelve magnets in each section equally spaced making up four sections.

Forty-eight permanent magnets are divided into 4 sets of 12 flats per section set on a one and a half degree angle. The magnets are equally spaced.

The next section is rotated 15.0 degrees. The third is in the same position as the first one. The fourth is the same position as the second one. The shaft rotates when current is turned on to the electromagnets. The permanent magnets and the electromagnets push against each other causing the shaft to turn. Each end of the shaft has electromagnetic bearings. A flywheel on which end runs through a set of 8 coils on each side of the flywheels, that store energy while generating electricity.

A battery is charged and used, and then electromagnetic bearings are turned on centering the shaft on each end in bore and setting end gap on center shaft. The magnetic bearings allow for extra high rpm with minimal heat or friction. Then the thirty-two electromagnets are turned on repelling against the forty-eight permanent magnets that are aligned on center shafts on slight angle in four rows in line with four outer rows of s pointing inwards causing it to rotate. The flywheels are of ring type on each end of shaft with permanent magnets aligned on outer sides breaking magnetic field to generate energy. A regulator is used to limit energy generated at around 5175 rpm, while flywheel rotating at much higher speeds storing energy driven electric generator. Regenerating systems on cars putting energy back in the battery, along with small amount of energy from the flywheel drive electric generator.

Foot Pounds Produced

A one inch diameter electromagnet tested from Free Earth Resources LLC picks up 60.00 lb. and permanent magnets create 110 lb. figured at equal 60 lb. rate as electromagnets. The energy created between them is 120.00 inch pounds. This would produce 318.4 ft. pounds of torque and 313.00 horse power using the following formulas:

$$LB/ft = hp \times \frac{5250}{rpm} \text{ And}$$

$$Hp = lb/ft \times \frac{rpm}{5250}.$$

Figure 26:
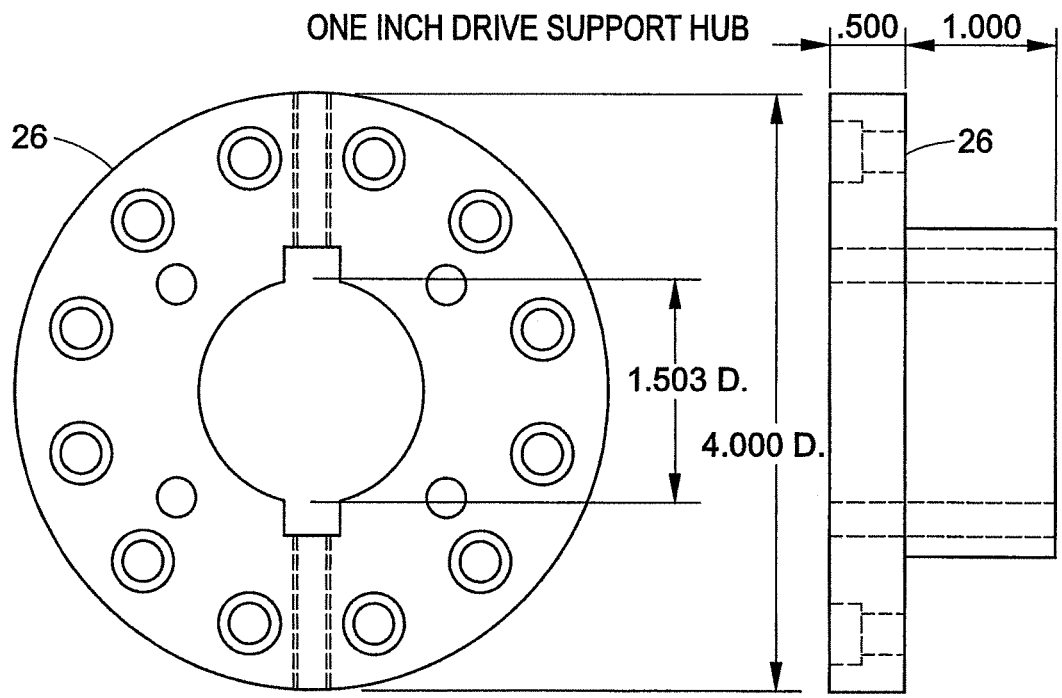
FIG. 26 is a one inch drive support hub.
Figure 27:
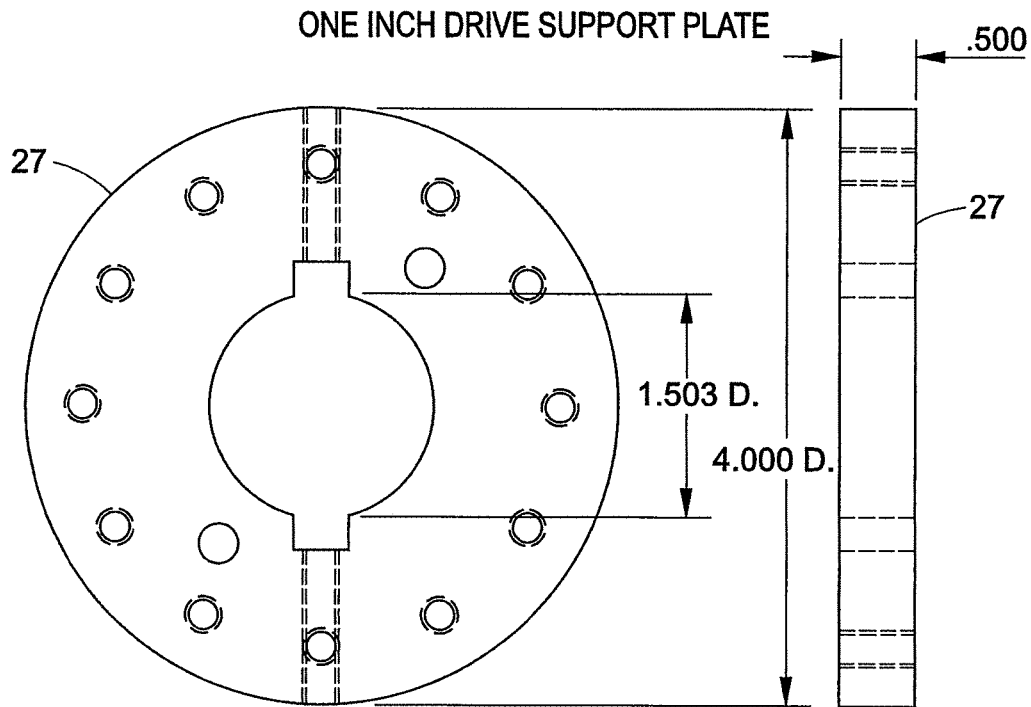
FIG. 27 is a one inch drive support plate.
Figure 28:
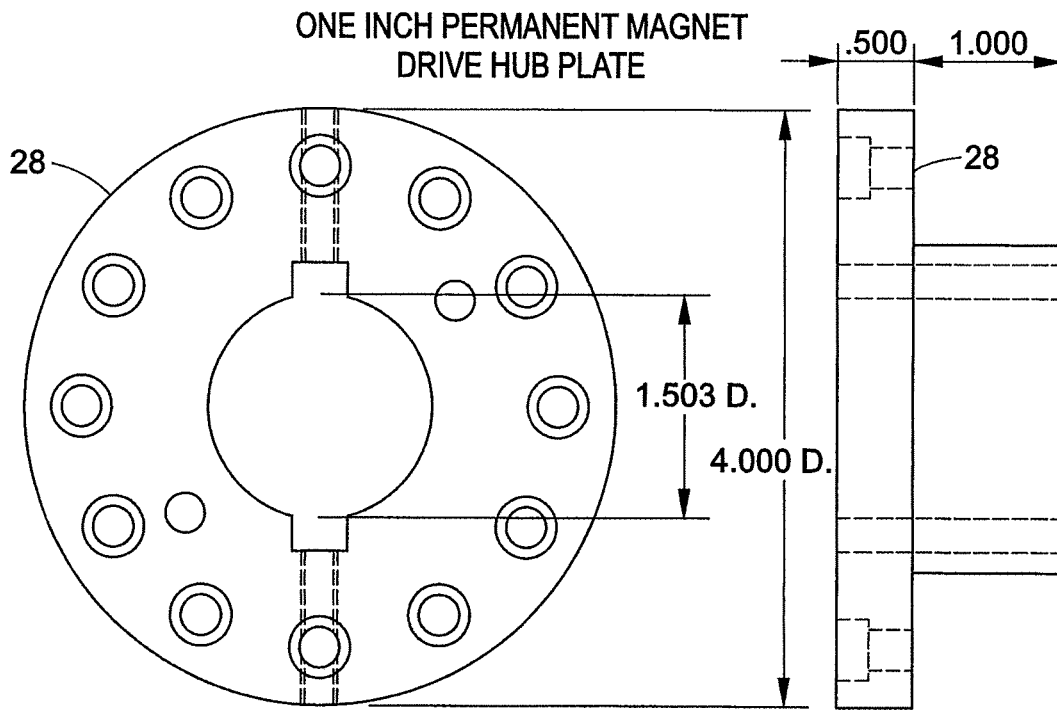
FIG. 28 is a one inch permanent magnet drive hub plate.
Figure 29:
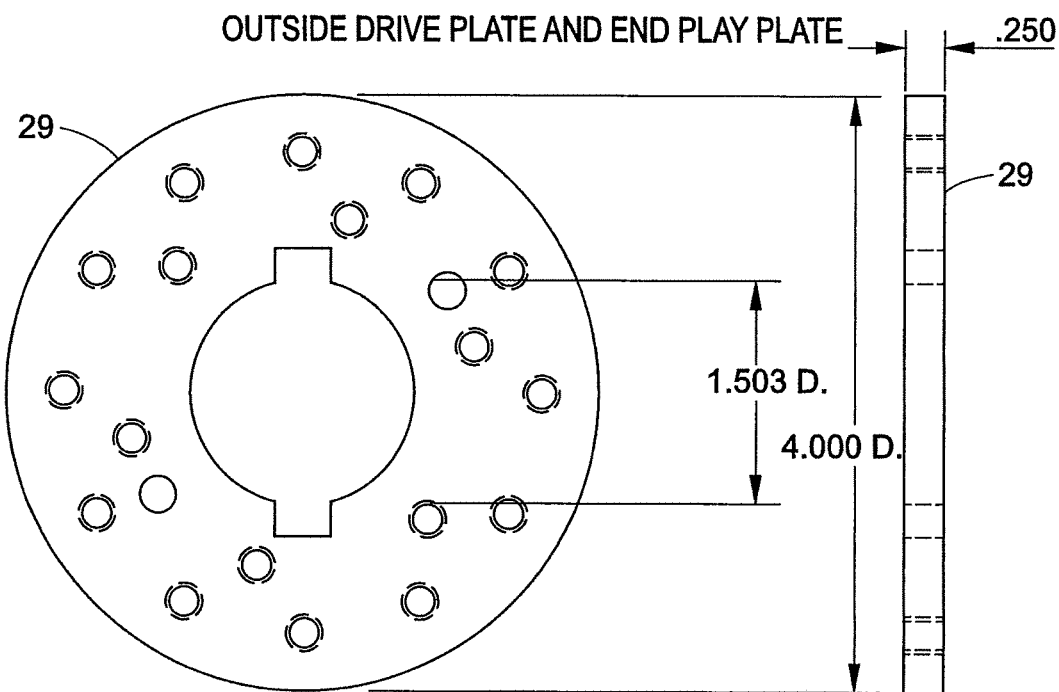
FIG. 29 is an outside drive plate and end play plate.
Figure 30:
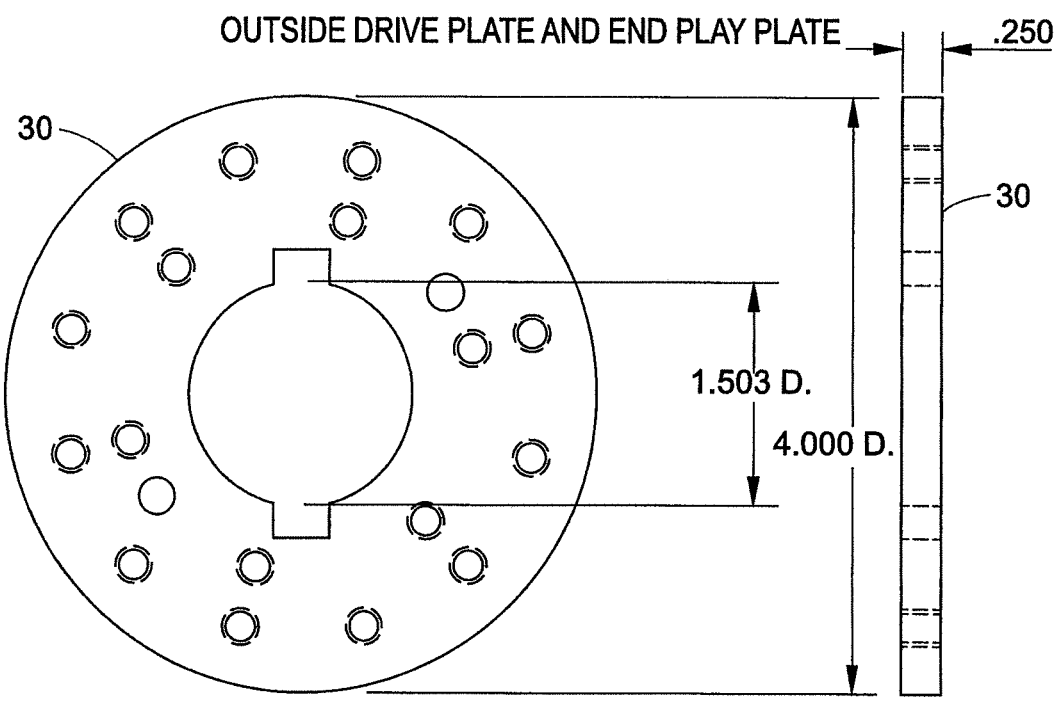
FIG. 30 is an outside drive plate and end play plate.
Figure 31:
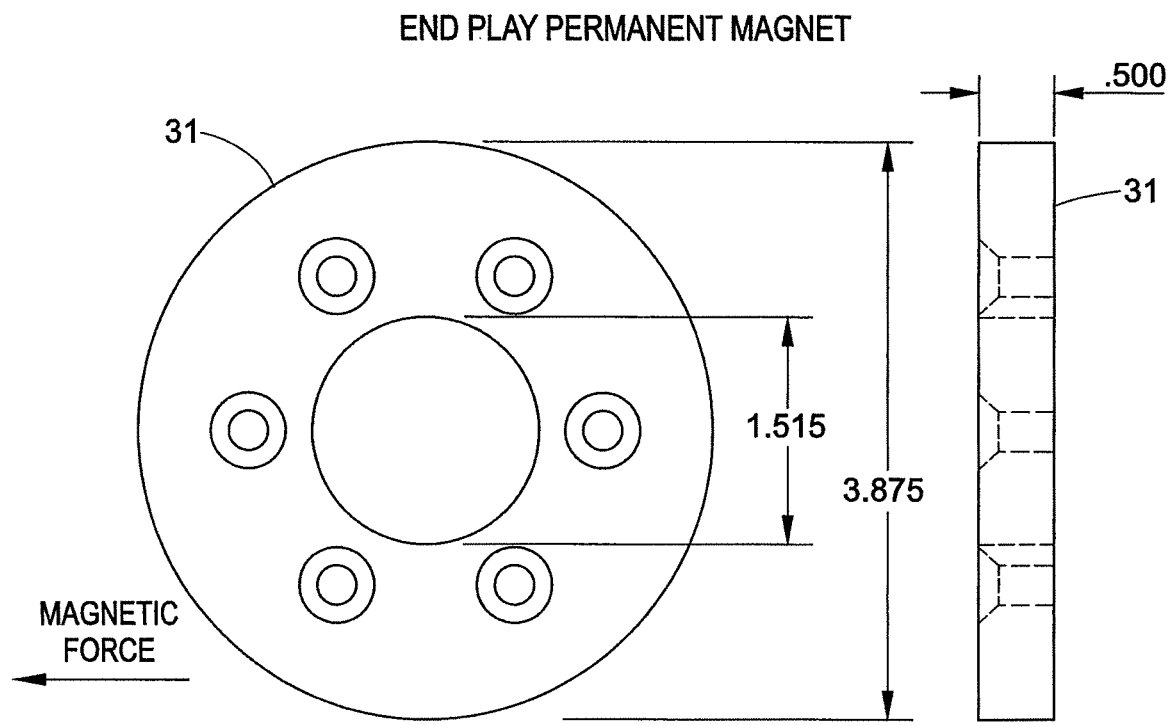
FIG. 31 is an end play permanent magnet.
Figure 32:
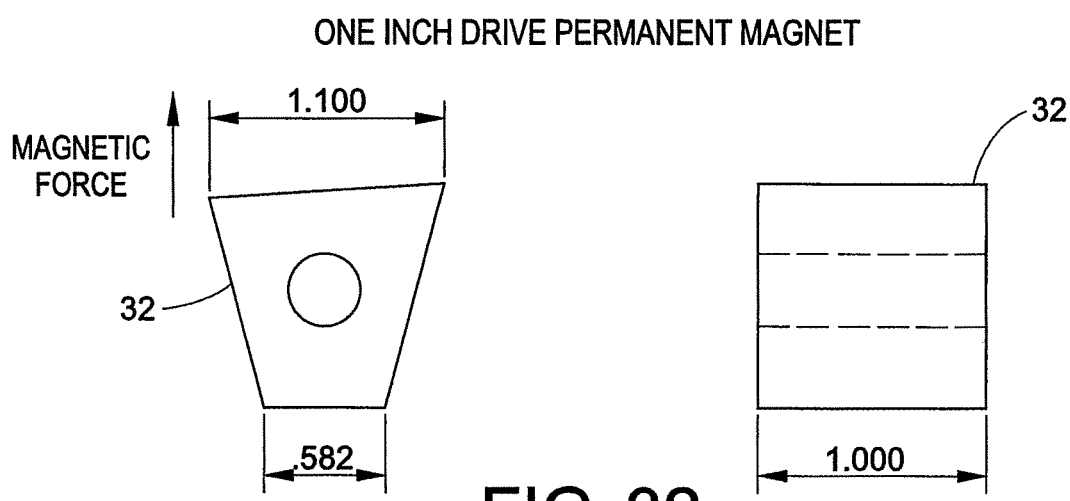
FIG. 32 is a one inch drive permanent magnet.
Figure 33:
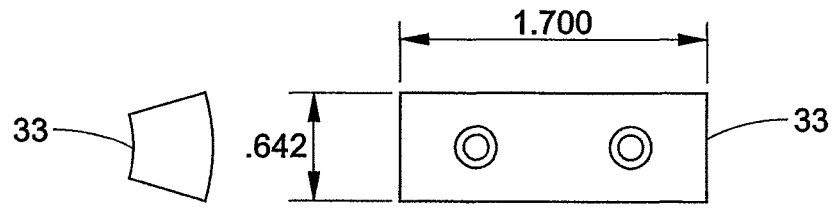
FIG. 33 is a permanent magnet for inside electric bearing.
Figure 34:
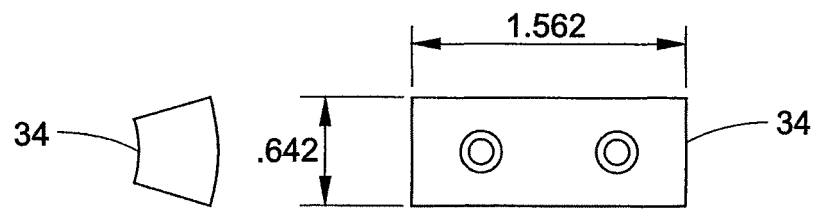
FIG. 34 is an outer permanent magnet for outside electric bearing.
Figure 35:
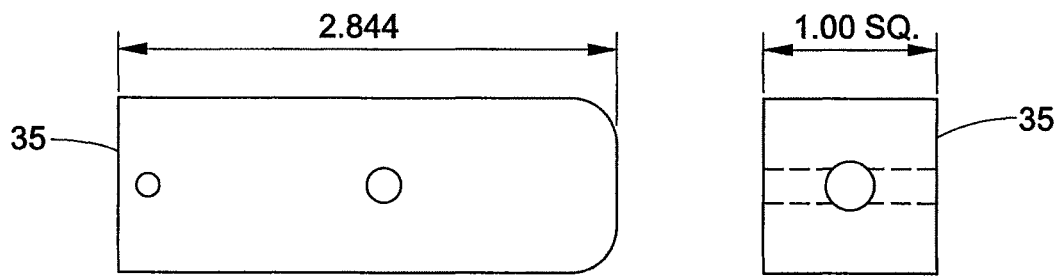
FIG. 35 is a one inch bar for electromagnet.
Figure 36:
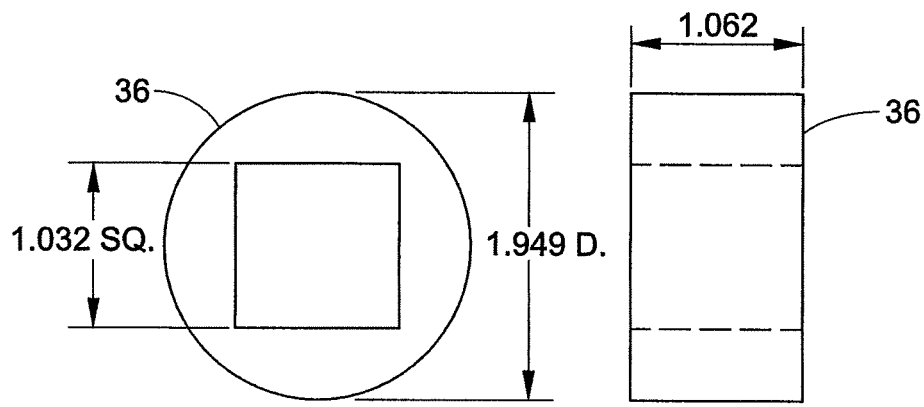
FIG. 36 is a one inch electromagnet coil 3W 1-Amp.
Figure 37:
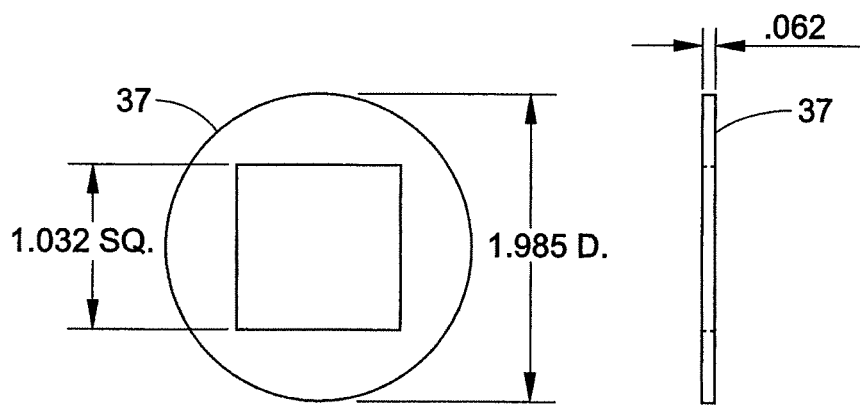
FIG. 37 is a one inch electromagnet insulator coil ends.
Figure 38:
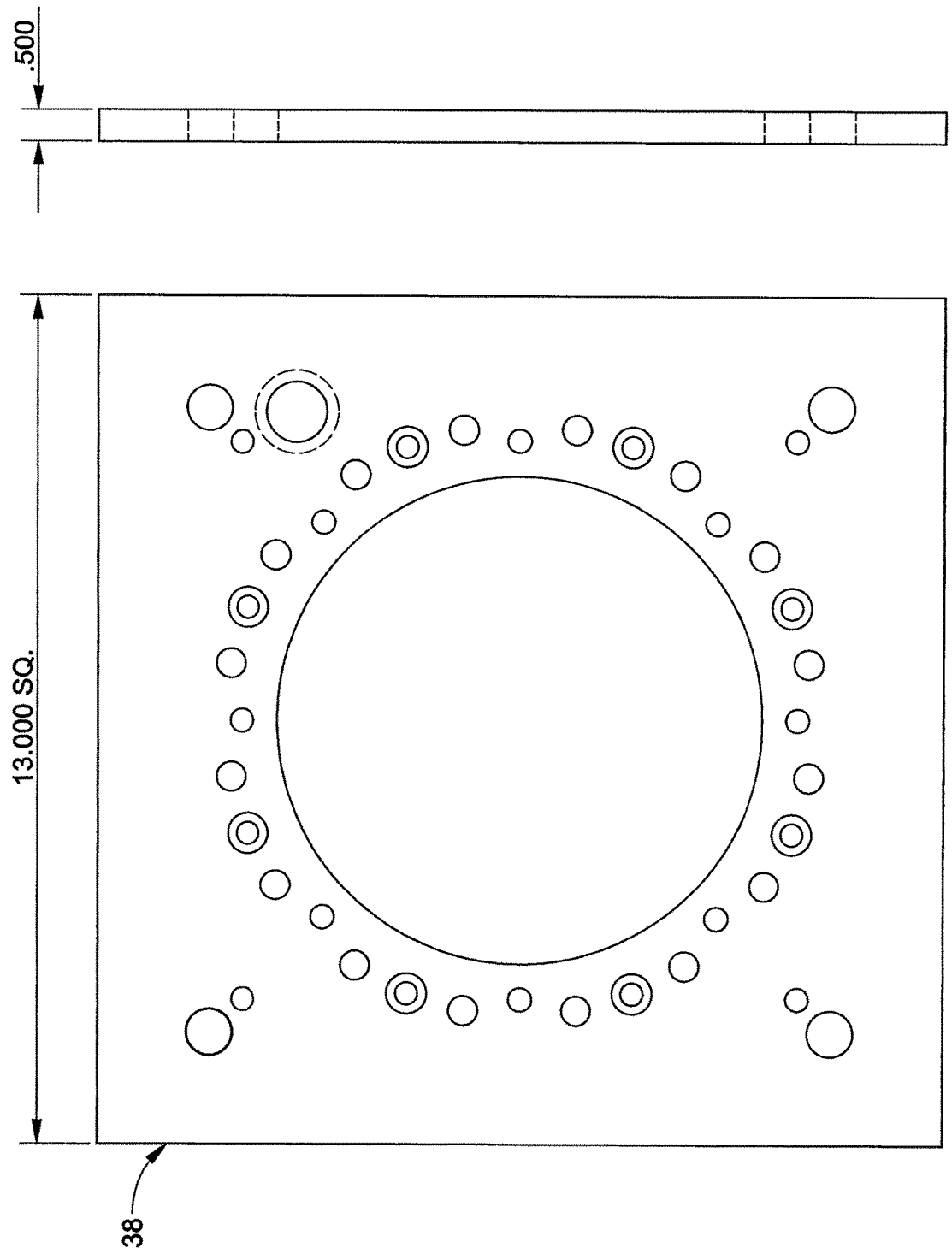
FIG. 38 is a lid for one inch electromagnet support plate.
Figure 39:
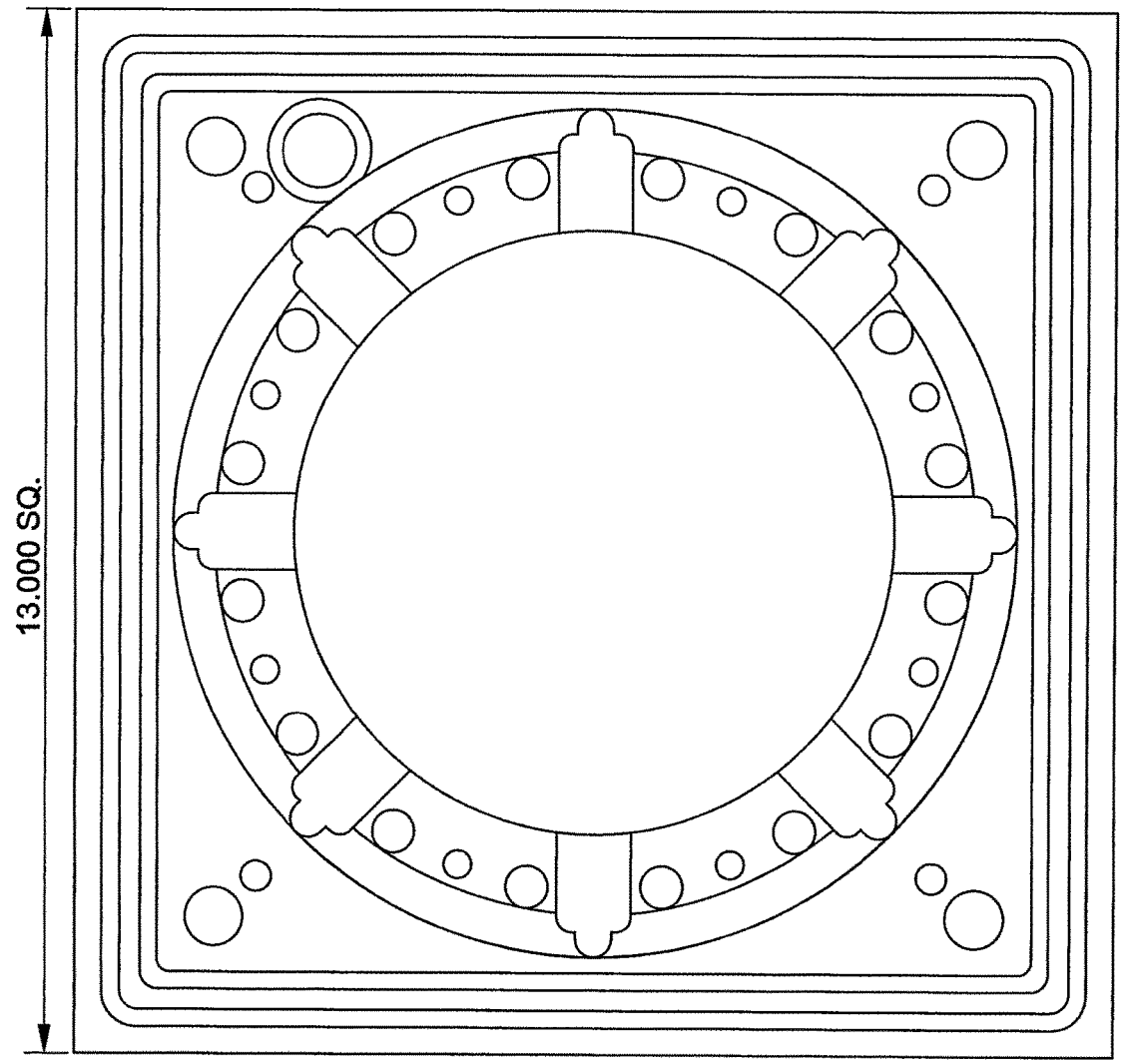
FIG. 39 is a one inch electromagnet support plate.
Figure 40:
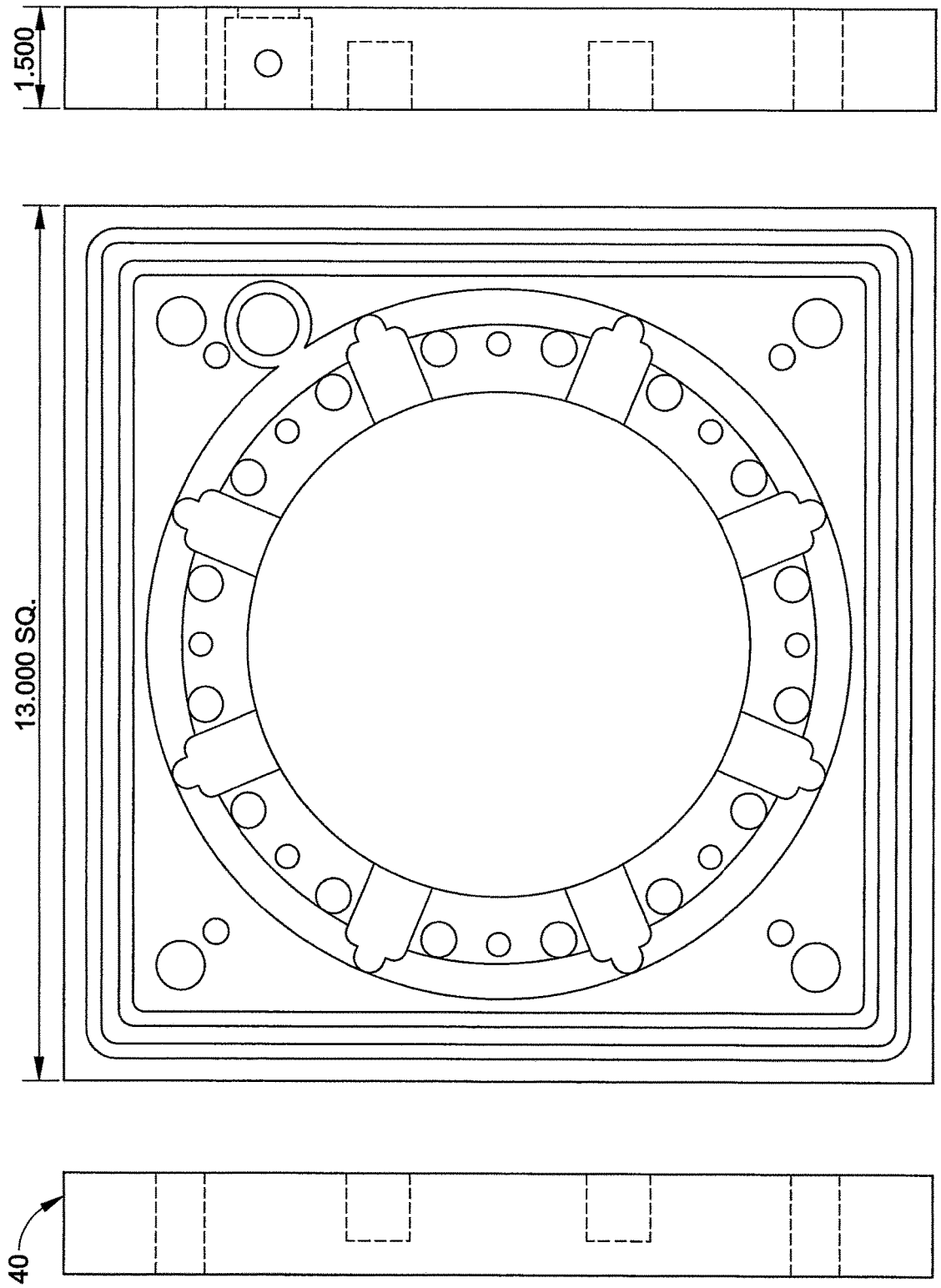
FIG. 40 is a one inch electromagnet support plate.
Figure 41:
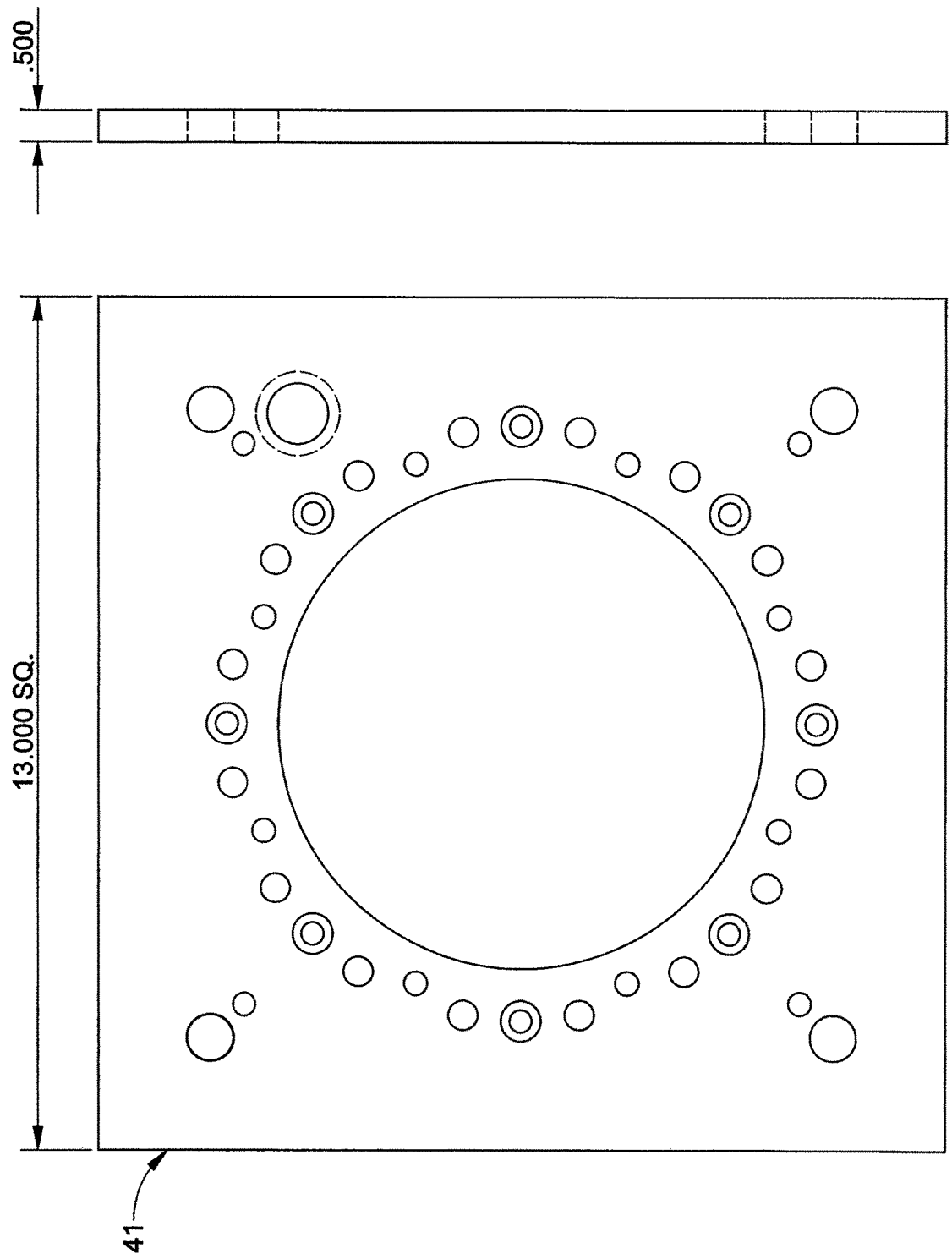
FIG. 41 is a lid for one inch electromagnet support plate.
Figure 42:
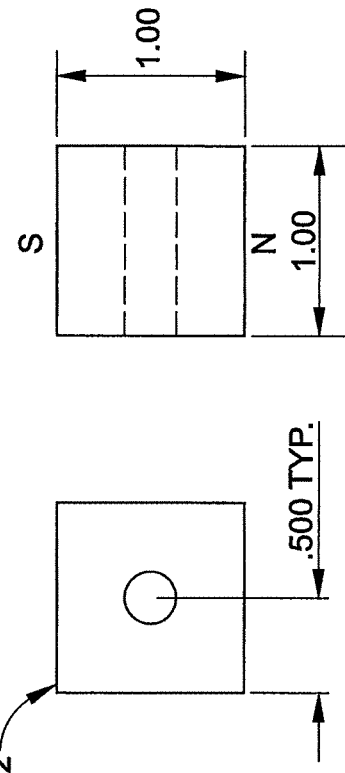
FIG. 42 is a flywheel pick-up magnet.
Figure 43:
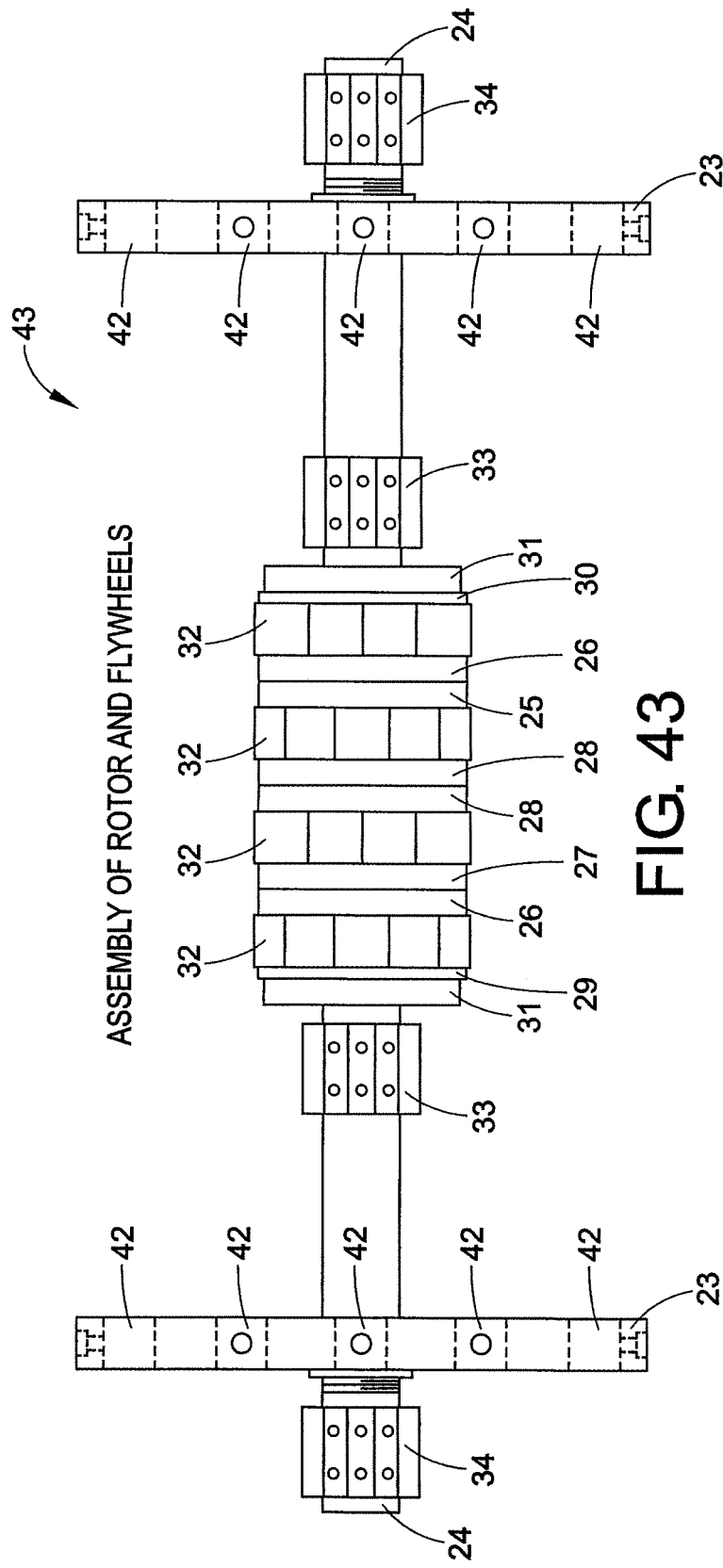
FIG. 43 is an assembly of rotor and flywheels.

Actual rpm is much higher, but is figured at 5,175 rpm, and is most kW to be made at this twelve inch by twelve inch by twenty inch size. So an alternator type is needed for rpm and generator rate created. A power plant can be connected to a gear box at either or both ends depending on the application or power something by hooking up power leads. The power plant will be started by a 12 volt battery about 100 amps to power the system. Once the system is powered up, it will store approximately 2,200 Amps (233.498 kW) or (233,498 watts DC voltage) providing over 2,000 Amps. The formulas are calculated by GE standards for 87 degree F. and annealed copper wiring, see FIG. 26. The cooling system is controlled by 8 tubes from each end plate filled with liquid nitrogen gas and air.

The flywheel drive electric generator includes a series of permanent magnets on each side of both flywheels. The outer perimeter flywheels turn through coils 360 degrees around it while it turns generating power with a small amount of that power sent back to the battery. The remaining energy can be used to power up cars, machines, wheel chairs, military drones etc. that the flywheels store. The system is light and can be operated an extended time with traditional electrical car battery packs.

Alternative Power Producing Supply

The power plant can power automobiles or machines. Other examples include turbines at hydropower plants. Instead of water at 250 ft/lbs to turn turbines, the power plants disclosed herein could be used instead of nuclear or coal heating water into steam in other type plants. It could turn the turbines itself.

Versatility

According to an exemplary embodiment, the disclosed power plant is only one foot tall and one foot wide and 1.5 feet long, and is versatile enough to be built at whatever size is needed for the job it's going to be doing, and should run off of lesser energy than traditional designs. The disclosed power plant produces more useable energy from flywheels and is much lighter than conventional designs.

A modular design makes it possible to achieve more torque than with the use of a single section. In addition, the configuration can be changed, eliminating the need to change over the diameter of the components to achieve relatively more torque.

A regulator is used to limit the voltage being created at 5175 rpm because of the size of the wire needed for voltage figured because of the size of model 12 in x 12 in. Also, 5175 rpm is 60 cycles equivalent to the AC voltage available in the USA if AC voltage is desired as opposed to DC voltage.

A standard formula used for calculating watts is one hp for 746 watts, instead of the torque used for calculating voltage. Therefore, instead of having eight permanent magnets turning inside of the eight electromagnets, which did not affect torque very much but did affect hp for around 100 hp, 12 permanent magnets are used instead of the eight to use the formula for watts raising the hp close to the same as the torque measurement. The gap between them is 0.570 on permanent magnets. Now, it's 0.046 on the same 4' diameter to achieve this. A standard generator's rpm is 1800 rpm for single pole, 1 positive-negative leads 3600 rpm, for double leads, 2 positive and two negative to achieve the number of cycles or Hz per second for standard electric. This set up the number of permanent magnets and number of coils for the flywheels to generate. Rpm is much faster than 5175 rpm. The regulator is regulating voltage on the flywheels cresting, not the rpm.

Figure 44:
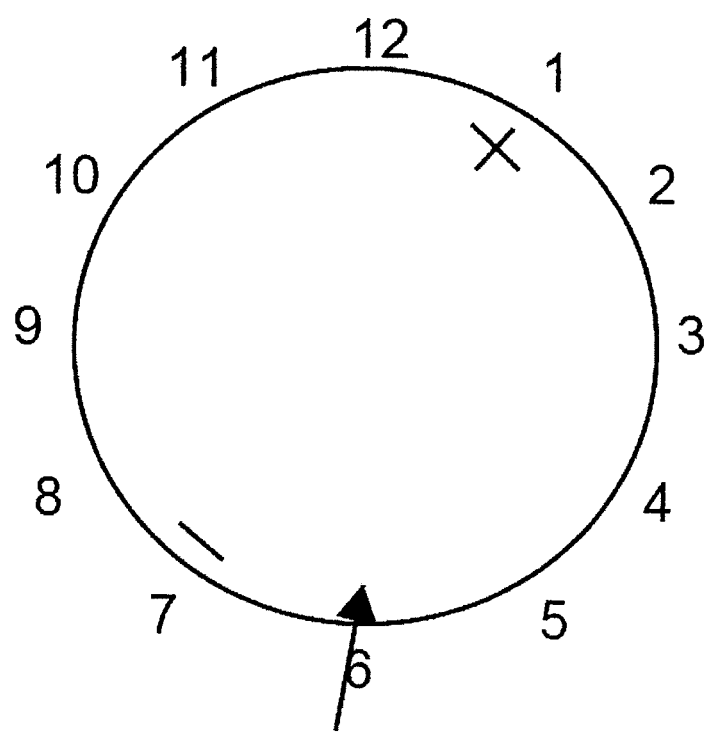
FIG. 44 illustrates a 12 magnet configuration with a repellant configuration for the electromagnets and the permanent magnets.

As shown in FIG. 44, magnet pointing at positive on No. 1 from 6:00 that is negative, can't wiggle past on one, change the one you're using at 6:00 to positive like No. 1 is and it turns No. 1 positive counterclockwise to the number 7 and negative at 7 goes right past the one at 6:00 clock counter clockwise to 1:00 clock where the positive was. So, by negative at 7:00 clock going by positive at 6:00, you're pointing at 1:00 clock makes the field of efficiency of the magnets strength stronger by using positive to positive or negative to negative stronger than standard positive to negative —attraction method making my torque and hp stronger than I got figured calculations on.

Housing is aluminum or manmade synthetic material to make the device lighter and provide better strength, stay cooler, not effected by any extreme electrical or magnetic forces.

Same polarity instead of opposite. A repellant configuration is used instead of an attraction configuration for electromagnets 32 and permanent magnets 48. It is stronger with the same polarity. One example is shown in FIG. 44.

As shown in FIG. 44, with the magnet pointing at positive on No. 1 from 6:00 clock, this is negative you can't wiggle positive on number one change the one used at 6:00 clock to positive like No. 1 is and it turns No. 1 positive counterclockwise to the number 7 and the negative at 7 goes right past the one at 6:00 clock counterclockwise to 1:00 clock where the positive was. So, by negative at 7:00 clock going by positive at 6:00 clock it is pointing at 1:00 clock makes the efficiency of the magnets stronger than a standard positive to negative—attraction method. Because it's easier to push than to pull making the torque and hp stronger than what was originally anticipated by calculation.

Reference Characters:

| Ref. Character | Description |
| --- | --- |
| 1 | Dynamic Block Wiring Diagram |
| 2 | Assembly Of Flywheel Driven Electric Generator And Storage Device Known As A (Jim) |
| 3 | .750 Tie Bolt |
| 4 | One Inch Electromagnet Plates Electrical Connector |
| 5 | Bus Bar For Pick-Up Coils |
| 6 | Dual Shrader Valve With Cut-Off |
| 7 | Coolant Rod |
| 8 | Inside Electric Bearing Rod |
| 9 | Electric Bearing Coil 3W 1-Amp |
| 10 | Inside Electric Bearing Insulator |
| 11 | Coolant Rod And Inside Bearing Retainer Plate |
| 12 | Inside Bearing Support Plate And Coolant Reservoir |
| 13 | Backside Of Inside Bearing Support And Coolant Reservoir Plate |
| 14 | Pick-Up And Coil Mounting Bolt |
| 15 | Pick-Up 60 Amp Coil |
| 16 | Outer Bearing Insulator |
| 17 | Outer Electric Bearing Rod |
| 18 | Pick-Up Coil Box Spacer |
| 19 | Assembly For Flywheel And Pick-Up Coil |
| 20 | Pick-Up Coil Mounting Plate |
| 21 | Inner Pick-Up Coil Box |
| 22 | Outer Pick-Up Coil Box |
| 23 | 11 Inch × 1 Inch Flywheel |
| 24 | Main Shaft |
| 25 | One Inch Drive Support Plate |
| 26 | One Inch Drive Support Hub |
| 27 | One Inch Drive Support Plate |
| 28 | One Inch Permanent Magnet Drive Hub Plate |
| 29 | Outside Drive Plate And End Play Plate |
| 30 | Outside Drive Plate And End Play Plate |
| 31 | End Play Permanent Magnet |
| 32 | One Inch Drive Permanent Magnet |
| 33 | Permanent Magnets For Inside Electric Bearing |
| 34 | Outer Permanent Magnets For Outside Electric Bearing |
| 35 | One Inch Bar For Electromagnet |
| 36 | One Inch Electromagnet Coil 3W 1-Amp |
| 37 | One Inch Electromagnet Insulator Coil Ends |
| 38 | Lid For One Inch Electromagnet Support Plate |
| 39 | One Inch Electromagnet Support Plate |
| 40 | One Inch Electromagnet Support Plate |
| 41 | Lid For One Inch Electromagnet Support Plate |
| 42 | Flywheel Pick-Up Magnet |
| 43 | Assembly of Rotor And Flywheels |

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An electromechanical device comprising:
a stationary housing member including a longitudinally extended rotor cavity and a plurality of longitudinally adjacent rows of equally spaced electromagnets which are offset 45 degrees and directed towards the rotor cavity, each row of electromagnets arranged in an octagonal shape and each row of electromagnets rotationally offset 22.5 degrees from each longitudinally adjacent row of electromagnets, and each electromagnet configured to simultaneously generate equivalent magnetic fields of equivalent polarities;
a rotating member longitudinally extended within the rotor cavity of the stationary housing member, the rotating member including a plurality of longitudinally adjacent rows of permanent magnets equally spaced and arranged along an outside surface of the rotary member, each row of permanent magnets arranged in a circular shape and rotationally offset 15 degrees from each longitudinally adjacent row of permanent magnets and each permanent magnet configured to simultaneously generate equivalent magnetic fields of equivalent polarities which are repellant to the electromagnet generated equivalent magnetic fields of equivalent polarities, and each permanent magnet set on an incline of 1.5 degrees relative to the outside surface of the rotating member to provide a rotational movement of the rotating member with the stationary housing member plurality of longitudinally adjacent rows of electromagnets energized;

a magnetic bearing system for supporting the rotating member with respect to the stationary housing member; and one or more fly wheel hub assemblies operatively coupled to the rotating member, the one or more fly wheel hub assemblies including a permanent magnet electrical generator integral with the one or more fly wheel hub assemblies, the permanent magnetic electrical generator configured to generate electrical power as the rotating member rotates within the stationary housing member rotor cavity.

2. An electromechanical device comprising:

a stationary housing member including a longitudinally extended rotor cavity and a plurality of longitudinally adjacent rows of equally spaced electromagnets which are offset 45 degrees and directed towards the rotor cavity, each row of electromagnets mounted to an independent section of the stationary housing member and each row of electromagnets arranged in an octagonal shape and each row of electromagnets rotationally offset 22.5 degrees from each longitudinally adjacent row of electromagnets, and each electromagnet configured to simultaneously generate equivalent magnetic fields of equivalent polarities;

a rotating member longitudinally extended within the rotor cavity of the stationary housing member, the rotating member including a plurality of longitudinally adjacent rows of permanent magnets equally spaced and arranged along an outside surface of the rotary member, each row of permanent magnets arranged in a circular shape and rotationally offset 15 degrees from each longitudinally adjacent row of permanent magnets and each permanent magnet configured to simultaneously generate equivalent magnetic fields of equivalent polarities which are repellant to the electromagnet generated equivalent magnetic fields of equivalent polarities, and each permanent magnet set on an incline of 1.5 degrees relative to the outside surface of the rotating member to provide a rotational movement of the rotating member with the stationary housing member plurality of longitudinally adjacent rows of electromagnets energized; and one or more fly wheel hub assemblies operatively coupled to the rotating member, the one or more fly wheel hub assemblies including a permanent magnet electrical generator integral with the one or more fly wheel hub assemblies, the permanent magnetic electrical generator configured to generate electrical power as the rotating member rotates within the stationary housing member rotor cavity.

\* \* \* \* \*